(12) United States Patent
Woo et al.

(10) Patent No.: US 12,212,945 B2
(45) Date of Patent: Jan. 28, 2025

(54) NETWORK MICROPHONE DEVICES WITH AUTOMATIC DO NOT DISTURB ACTUATION CAPABILITIES

(71) Applicant: Sonos, Inc., Santa Barbara, CA (US)

(72) Inventors: Sein Woo, Somerville, MA (US); Ryan Myers, Santa Barbara, CA (US); Charles Freedman, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 17/932,715

(22) Filed: Sep. 16, 2022

(65) Prior Publication Data

US 2023/0122316 A1   Apr. 20, 2023

Related U.S. Application Data

(63) Continuation of application No. 17/135,123, filed on Dec. 28, 2020, now Pat. No. 11,451,908, which is a
(Continued)

(51) Int. Cl.
*H04R 5/04* (2006.01)
*G06F 3/16* (2006.01)
(Continued)

(52) U.S. Cl.
CPC ............ *H04R 5/04* (2013.01); *G06F 3/167* (2013.01); *G06F 9/542* (2013.01); *G10L 21/055* (2013.01); *H04R 2430/01* (2013.01)

(58) Field of Classification Search
CPC ...... H04R 5/04; H04R 2430/01; H04R 3/005; H04R 27/00; H04R 2227/005;
(Continued)

(56) References Cited

U.S. PATENT DOCUMENTS 999,715 A    8/1911  Gundersen
5,717,768 A  2/1998  Laroche
(Continued)

FOREIGN PATENT DOCUMENTS

CN   1323435 A   11/2001
CN   1748250 A   3/2006
(Continued)

OTHER PUBLICATIONS

Non-Final Office Action mailed on Oct. 4, 2022, issued in connection with U.S. Appl. No. 16/915,234, filed Jun. 29, 2020, 16 pages.
(Continued)

*Primary Examiner* — Paul Kim
(74) *Attorney, Agent, or Firm* — Akerman LLP

(57) ABSTRACT

Embodiments disclosed herein include networked microphone devices (NMD) determining whether a Do Not Disturb (DND) feature should be activated, in response to determining that the DND feature should be activated, activating the DND feature. In some embodiments, the NMD determines whether to activate the DND feature based on various configuration and operational states. And in some embodiments, activating the DND feature includes activating the DND feature includes activating the DND feature at one or more additional NMDs based on the configuration and operational state of the NMD and the one or more additional NMDs.

20 Claims, 12 Drawing Sheets

Related U.S. Application Data continuation of application No. 16/214,711, filed on Dec. 10, 2018, now Pat. No. 10,880,650.

(60) Provisional application No. 62/596,902, filed on Dec. 10, 2017.

(51) Int. Cl.
  *G06F 9/54* (2006.01)
  *G10L 21/055* (2013.01)

(58) Field of Classification Search
  CPC .......... G06F 3/167; G06F 9/542; G06F 9/485; G06F 3/165; G10L 21/055; H04N 21/4302
  USPC .............. 381/56, 58, 91, 122, 124, 300, 311
  See application file for complete search history.

(56) References Cited

U.S. PATENT DOCUMENTS

| | | | |
|---|---|---|---|
| 5,857,172 | A | 1/1999 | Rozak |
| 6,070,140 | A | 5/2000 | Tran |
| 6,219,645 | B1 | 4/2001 | Byers |
| 7,516,068 | B1 | 4/2009 | Clark |
| 7,705,565 | B2 | 4/2010 | Patino et al. |
| 8,085,947 | B2 | 12/2011 | Haulick et al. |
| 8,233,632 | B1 | 7/2012 | Macdonald et al. |
| 8,325,909 | B2 | 12/2012 | Tashev et al. |
| 8,594,320 | B2 | 11/2013 | Faller |
| 8,620,232 | B2 | 12/2013 | Helsloot |
| 8,639,214 | B1 | 1/2014 | Fujisaki |
| 8,719,039 | B1 | 5/2014 | Sharifi |
| 8,762,156 | B2 | 6/2014 | Chen |
| 9,002,024 | B2 | 4/2015 | Nakadai et al. |
| 9,047,857 | B1 | 6/2015 | Barton |
| 9,070,367 | B1 | 6/2015 | Hoffmeister et al. |
| 9,088,336 | B2 | 7/2015 | Mani et al. |
| 9,183,845 | B1 | 11/2015 | Gopalakrishnan et al. |
| 9,313,317 | B1 | 4/2016 | Lebeau et al. |
| 9,354,687 | B2 | 5/2016 | Bansal et al. |
| 9,361,885 | B2 | 6/2016 | Ganong, III et al. |
| 9,443,516 | B2 | 9/2016 | Katuri et al. |
| 9,514,747 | B1 | 12/2016 | Bisani et al. |
| 9,532,139 | B1 | 12/2016 | Lu et al. |
| 9,542,941 | B1 | 1/2017 | Weksler et al. |
| 9,558,755 | B1 | 1/2017 | Laroche et al. |
| 9,640,194 | B1 | 5/2017 | Nemala et al. |
| 9,672,812 | B1 | 6/2017 | Watanabe et al. |
| 9,691,384 | B1 | 6/2017 | Wang et al. |
| 9,706,320 | B2 | 7/2017 | Starobin et al. |
| 9,749,738 | B1 | 8/2017 | Adsumilli et al. |
| 9,756,422 | B2 | 9/2017 | Paquier et al. |
| 9,767,786 | B2 | 9/2017 | Starobin et al. |
| 9,779,732 | B2 | 10/2017 | Lee et al. |
| 9,779,734 | B2 | 10/2017 | Lee |
| 9,781,532 | B2 | 10/2017 | Sheen |
| 9,799,330 | B2 | 10/2017 | Nemala et al. |
| 9,805,733 | B2 | 10/2017 | Park |
| 9,812,128 | B2 | 11/2017 | Mixter et al. |
| 9,875,740 | B1 | 1/2018 | Kumar et al. |
| 9,898,250 | B1 | 2/2018 | Williams et al. |
| 9,899,021 | B1 | 2/2018 | Vitaladevuni et al. |
| 9,992,642 | B1 | 6/2018 | Rapp et al. |
| 10,025,447 | B1 | 7/2018 | Dixit et al. |
| 10,028,069 | B1 | 7/2018 | Lang |
| 10,089,981 | B1 | 10/2018 | Elangovan et al. |
| 10,134,388 | B1 | 11/2018 | Lilly |
| 10,134,398 | B2 | 11/2018 | Sharifi |
| 10,186,266 | B1 | 1/2019 | Devaraj et al. |
| 10,186,276 | B2 | 1/2019 | Dewasurendra et al. |
| 10,229,680 | B1 | 3/2019 | Gillespie et al. |
| 10,241,754 | B1 | 3/2019 | Kadarundalagi Raghuram Doss et al. |
| 10,249,205 | B2 | 4/2019 | Hammersley et al. |
| 10,304,440 | B1 | 5/2019 | Panchapagesan et al. |
| 10,304,475 | B1 | 5/2019 | Wang et al. |
| 10,318,236 | B1 | 6/2019 | Pal et al. |
| 10,332,508 | B1 | 6/2019 | Hoffmeister |
| 10,339,957 | B1 | 7/2019 | Chenier et al. |
| 10,354,658 | B2 | 7/2019 | Wilberding |
| 10,424,296 | B2 | 9/2019 | Penilla et al. |
| 10,445,365 | B2 | 10/2019 | Luke et al. |
| 10,515,625 | B1 | 12/2019 | Metallinou et al. |
| 10,565,998 | B2 | 2/2020 | Wilberding |
| 10,573,312 | B1 | 2/2020 | Thomson et al. |
| 10,580,405 | B1 | 3/2020 | Wang et al. |
| 10,586,534 | B1 | 3/2020 | Argyropoulos et al. |
| 10,593,328 | B1 | 3/2020 | Wang et al. |
| 10,593,330 | B2 | 3/2020 | Sharifi |
| 10,600,406 | B1 | 3/2020 | Shapiro et al. |
| 10,621,981 | B2 | 4/2020 | Sereshki |
| 10,623,811 | B1 | 4/2020 | Cwik |
| 10,643,609 | B1 | 5/2020 | Pogue et al. |
| 10,685,669 | B1 | 6/2020 | Lan et al. |
| 10,699,711 | B2 | 6/2020 | Reilly |
| 10,706,843 | B1 | 7/2020 | Elangovan et al. |
| 10,728,196 | B2 | 7/2020 | Wang |
| 10,748,531 | B2 | 8/2020 | Kim |
| 10,777,189 | B1 | 9/2020 | Fu et al. |
| 10,777,203 | B1 | 9/2020 | Pasko |
| 10,797,667 | B2 | 10/2020 | Fish et al. |
| 10,824,682 | B2 | 11/2020 | Alvares et al. |
| 10,825,471 | B2 | 11/2020 | Walley et al. |
| 10,837,667 | B2 | 11/2020 | Nelson et al. |
| 10,847,137 | B1 | 11/2020 | Mandal et al. |
| 10,847,149 | B1 | 11/2020 | Mok et al. |
| 10,867,596 | B2 | 12/2020 | Yoneda et al. |
| 10,867,604 | B2 | 12/2020 | Smith et al. |
| 10,871,943 | B1 | 12/2020 | D'Amato et al. |
| 10,878,811 | B2 | 12/2020 | Smith et al. |
| 10,878,826 | B2 | 12/2020 | Li et al. |
| 10,911,596 | B1 | 2/2021 | Do et al. |
| 10,964,314 | B2 | 3/2021 | Jazi et al. |
| 11,024,311 | B2 | 6/2021 | Mixter et al. |
| 11,050,615 | B2 | 6/2021 | Mathews et al. |
| 11,062,705 | B2 | 7/2021 | Watanabe et al. |
| 11,100,923 | B2 | 8/2021 | Fainberg et al. |
| 11,127,405 | B1 | 9/2021 | Antos et al. |
| 11,137,979 | B2 | 10/2021 | Plagge |
| 11,138,969 | B2 | 10/2021 | D'Amato |
| 11,159,878 | B1 | 10/2021 | Chatlani et al. |
| 11,172,328 | B2 | 11/2021 | Soto et al. |
| 11,172,329 | B2 | 11/2021 | Soto et al. |
| 11,175,880 | B2 | 11/2021 | Liu et al. |
| 11,184,704 | B2 | 11/2021 | Jarvis et al. |
| 11,206,052 | B1 | 12/2021 | Park et al. |
| 11,212,612 | B2 | 12/2021 | Lang et al. |
| 11,264,019 | B2 | 3/2022 | Bhattacharya et al. |
| 11,277,512 | B1 | 3/2022 | Leeds et al. |
| 11,315,556 | B2 | 4/2022 | Smith et al. |
| 11,354,092 | B2 | 6/2022 | D'Amato et al. |
| 11,361,763 | B1 | 6/2022 | Maas et al. |
| 11,411,763 | B2 | 8/2022 | Mackay et al. |
| 11,445,301 | B2 | 9/2022 | Park et al. |
| 11,514,898 | B2 | 11/2022 | Millington |
| 2001/0003173 | A1 | 6/2001 | Lim |
| 2002/0054685 | A1 | 5/2002 | Avendano et al. |
| 2002/0055950 | A1 | 5/2002 | Witteman |
| 2002/0143532 | A1 | 10/2002 | McLean et al. |
| 2004/0153321 | A1 | 8/2004 | Chung et al. |
| 2004/0161082 | A1 | 8/2004 | Brown et al. |
| 2005/0033582 | A1 | 2/2005 | Gadd et al. |
| 2005/0254662 | A1 | 11/2005 | Blank et al. |
| 2007/0038999 | A1 | 2/2007 | Millington |
| 2007/0060054 | A1 | 3/2007 | Romesburg |
| 2007/0286426 | A1 | 12/2007 | Xiang et al. |
| 2008/0008333 | A1 | 1/2008 | Nishikawa et al. |
| 2008/0031466 | A1 | 2/2008 | Buck et al. |
| 2008/0144858 | A1 | 6/2008 | Khawand et al. |
| 2008/0160977 | A1 | 7/2008 | Ahmaniemi et al. |
| 2008/0192946 | A1 | 8/2008 | Faller |
| 2008/0291916 | A1 | 11/2008 | Xiong et al. |
| 2009/0013255 | A1 | 1/2009 | Yuschik et al. |

(56) References Cited

U.S. PATENT DOCUMENTS

| | | |
|---|---|---|
| 2009/0046866 A1 | 2/2009 | Feng et al. |
| 2009/0113053 A1 | 4/2009 | Van Wie et al. |
| 2009/0214048 A1 | 8/2009 | Stokes, III et al. |
| 2009/0299745 A1 | 12/2009 | Kennewick et al. |
| 2009/0323907 A1* | 12/2009 | Gupta ............... H04M 3/42365 |
| | | 379/88.13 |
| 2009/0323924 A1 | 12/2009 | Tashev et al. |
| 2010/0041443 A1 | 2/2010 | Yokota |
| 2010/0070276 A1 | 3/2010 | Wasserblat et al. |
| 2010/0179806 A1 | 7/2010 | Zhang et al. |
| 2010/0260348 A1 | 10/2010 | Bhow et al. |
| 2010/0278351 A1 | 11/2010 | Fozunbal et al. |
| 2010/0299639 A1 | 11/2010 | Ramsay et al. |
| 2010/0329472 A1 | 12/2010 | Nakadai et al. |
| 2010/0332236 A1 | 12/2010 | Tan |
| 2011/0019833 A1 | 1/2011 | Kuech et al. |
| 2011/0046952 A1 | 2/2011 | Koshinaka |
| 2011/0131032 A1 | 6/2011 | Yang, II et al. |
| 2011/0176687 A1 | 7/2011 | Birkenes |
| 2012/0009906 A1 | 1/2012 | Patterson et al. |
| 2012/0020485 A1 | 1/2012 | Visser et al. |
| 2012/0027218 A1 | 2/2012 | Every et al. |
| 2012/0076308 A1 | 3/2012 | Kuech et al. |
| 2012/0224457 A1 | 9/2012 | Kim et al. |
| 2012/0237047 A1 | 9/2012 | Neal et al. |
| 2012/0245941 A1 | 9/2012 | Cheyer |
| 2012/0265528 A1 | 10/2012 | Gruber et al. |
| 2012/0288100 A1 | 11/2012 | Cho |
| 2013/0051755 A1 | 2/2013 | Brown et al. |
| 2013/0073293 A1 | 3/2013 | Jang et al. |
| 2013/0080167 A1 | 3/2013 | Mozer |
| 2013/0080171 A1 | 3/2013 | Mozer et al. |
| 2013/0129100 A1 | 5/2013 | Sorensen |
| 2013/0185639 A1 | 7/2013 | Lim |
| 2013/0230184 A1 | 9/2013 | Kuech et al. |
| 2013/0238326 A1 | 9/2013 | Kim et al. |
| 2013/0283169 A1 | 10/2013 | Van Wie |
| 2013/0289994 A1 | 10/2013 | Newman et al. |
| 2013/0294611 A1 | 11/2013 | Yoo et al. |
| 2013/0301840 A1 | 11/2013 | Yemdji et al. |
| 2013/0336499 A1 | 12/2013 | Beckhardt et al. |
| 2014/0056435 A1 | 2/2014 | Kjems et al. |
| 2014/0064476 A1 | 3/2014 | Mani et al. |
| 2014/0108010 A1 | 4/2014 | Maltseff et al. |
| 2014/0126745 A1 | 5/2014 | Dickins et al. |
| 2014/0149118 A1 | 5/2014 | Lee et al. |
| 2014/0159581 A1 | 6/2014 | Pruemmer et al. |
| 2014/0161263 A1 | 6/2014 | Koishida et al. |
| 2014/0172899 A1 | 6/2014 | Hakkani-Tur et al. |
| 2014/0188476 A1 | 7/2014 | Li et al. |
| 2014/0200881 A1 | 7/2014 | Chatlani |
| 2014/0229959 A1 | 8/2014 | Beckhardt et al. |
| 2014/0244269 A1 | 8/2014 | Tokutake |
| 2014/0270216 A1 | 9/2014 | Tsilfidis et al. |
| 2014/0278343 A1 | 9/2014 | Tran |
| 2014/0278372 A1 | 9/2014 | Nakadai et al. |
| 2014/0278445 A1 | 9/2014 | Eddington, Jr. |
| 2014/0278933 A1 | 9/2014 | McMillan |
| 2014/0288686 A1 | 9/2014 | Sant et al. |
| 2014/0303969 A1 | 10/2014 | Inose et al. |
| 2014/0324203 A1 | 10/2014 | Coburn, IV et al. |
| 2014/0328490 A1 | 11/2014 | Mohammad et al. |
| 2014/0330896 A1 | 11/2014 | Addala et al. |
| 2014/0334645 A1 | 11/2014 | Yun et al. |
| 2014/0358535 A1 | 12/2014 | Lee et al. |
| 2014/0365225 A1 | 12/2014 | Haiut |
| 2014/0368734 A1 | 12/2014 | Hoffert et al. |
| 2015/0030172 A1 | 1/2015 | Gaensler et al. |
| 2015/0032443 A1 | 1/2015 | Karov et al. |
| 2015/0032456 A1 | 1/2015 | Wait |
| 2015/0039310 A1 | 2/2015 | Clark et al. |
| 2015/0039311 A1 | 2/2015 | Clark et al. |
| 2015/0039317 A1 | 2/2015 | Klein et al. |
| 2015/0058018 A1 | 2/2015 | Georges et al. |
| 2015/0066479 A1 | 3/2015 | Pasupalak et al. |
| 2015/0073807 A1 | 3/2015 | Kumar |
| 2015/0088500 A1 | 3/2015 | Conliffe |
| 2015/0126255 A1 | 5/2015 | Yang et al. |
| 2015/0154953 A1 | 6/2015 | Bapat et al. |
| 2015/0170665 A1 | 6/2015 | Gundeti et al. |
| 2015/0200923 A1 | 7/2015 | Triplett |
| 2015/0221307 A1 | 8/2015 | Shah et al. |
| 2015/0373100 A1 | 12/2015 | Kravets et al. |
| 2015/0382128 A1 | 12/2015 | Ridihalgh et al. |
| 2016/0018873 A1 | 1/2016 | Fernald et al. |
| 2016/0027440 A1 | 1/2016 | Gelfenbeyn et al. |
| 2016/0034448 A1 | 2/2016 | Tran |
| 2016/0035337 A1 | 2/2016 | Aggarwal et al. |
| 2016/0055847 A1 | 2/2016 | Dahan |
| 2016/0055850 A1 | 2/2016 | Nakadai et al. |
| 2016/0066087 A1 | 3/2016 | Solbach et al. |
| 2016/0070526 A1* | 3/2016 | Sheen ...................... H04R 3/04 |
| | | 700/94 |
| 2016/0077794 A1 | 3/2016 | Kim et al. |
| 2016/0093281 A1 | 3/2016 | Kuo et al. |
| 2016/0134924 A1 | 5/2016 | Bush et al. |
| 2016/0140957 A1 | 5/2016 | Duta et al. |
| 2016/0148612 A1 | 5/2016 | Guo et al. |
| 2016/0148615 A1 | 5/2016 | Lee et al. |
| 2016/0192099 A1* | 6/2016 | Oishi ................... H04R 29/007 |
| | | 381/56 |
| 2016/0212488 A1 | 7/2016 | Os et al. |
| 2016/0217789 A1 | 7/2016 | Lee et al. |
| 2016/0299737 A1 | 10/2016 | Clayton et al. |
| 2016/0372113 A1 | 12/2016 | David et al. |
| 2016/0379635 A1 | 12/2016 | Page |
| 2017/0025124 A1 | 1/2017 | Mixter et al. |
| 2017/0032244 A1 | 2/2017 | Kurata |
| 2017/0040002 A1 | 2/2017 | Basson et al. |
| 2017/0053648 A1 | 2/2017 | Chi |
| 2017/0053650 A1 | 2/2017 | Ogawa |
| 2017/0076726 A1 | 3/2017 | Bae |
| 2017/0083606 A1 | 3/2017 | Mohan |
| 2017/0084278 A1 | 3/2017 | Jung |
| 2017/0103748 A1 | 4/2017 | Weissberg et al. |
| 2017/0110130 A1 | 4/2017 | Sharifi et al. |
| 2017/0140750 A1 | 5/2017 | Wang et al. |
| 2017/0140757 A1 | 5/2017 | Penilla et al. |
| 2017/0151930 A1 | 6/2017 | Boesen |
| 2017/0164139 A1 | 6/2017 | Deselaers et al. |
| 2017/0186425 A1 | 6/2017 | Dawes et al. |
| 2017/0186427 A1 | 6/2017 | Wang et al. |
| 2017/0242656 A1 | 8/2017 | Plagge et al. |
| 2017/0269900 A1 | 9/2017 | Triplett |
| 2017/0269975 A1 | 9/2017 | Wood et al. |
| 2017/0300289 A1 | 10/2017 | Gattis |
| 2017/0300990 A1 | 10/2017 | Tanaka et al. |
| 2017/0329397 A1 | 11/2017 | Lin |
| 2017/0331869 A1 | 11/2017 | Bendahan et al. |
| 2017/0332035 A1* | 11/2017 | Shah ................... H04N 21/2393 |
| 2017/0357390 A1 | 12/2017 | Alonso Ruiz et al. |
| 2017/0364371 A1 | 12/2017 | Nandi et al. |
| 2017/0365247 A1 | 12/2017 | Ushakov |
| 2017/0374552 A1 | 12/2017 | Xia et al. |
| 2018/0012077 A1 | 1/2018 | Laska et al. |
| 2018/0018965 A1 | 1/2018 | Daley |
| 2018/0033429 A1 | 2/2018 | Makke et al. |
| 2018/0033438 A1 | 2/2018 | Toma et al. |
| 2018/0061409 A1 | 3/2018 | Valentine et al. |
| 2018/0096678 A1 | 4/2018 | Zhou et al. |
| 2018/0137857 A1 | 5/2018 | Zhou et al. |
| 2018/0139512 A1 | 5/2018 | Moran et al. |
| 2018/0158454 A1 | 6/2018 | Campbell et al. |
| 2018/0182383 A1 | 6/2018 | Kim et al. |
| 2018/0182397 A1 | 6/2018 | Carbune et al. |
| 2018/0182410 A1 | 6/2018 | Kaskari et al. |
| 2018/0188948 A1 | 7/2018 | Ouyang et al. |
| 2018/0190274 A1 | 7/2018 | Kirazci et al. |
| 2018/0196776 A1 | 7/2018 | Hershko et al. |
| 2018/0199130 A1 | 7/2018 | Jaffe et al. |
| 2018/0211665 A1 | 7/2018 | Park et al. |
| 2018/0233141 A1 | 8/2018 | Solomon et al. |
| 2018/0233142 A1 | 8/2018 | Koishida et al. |
| 2018/0233150 A1 | 8/2018 | Gruenstein et al. |

(56) References Cited

U.S. PATENT DOCUMENTS

| | | |
|---|---|---|
| 2018/0260680 A1 | 9/2018 | Finkelstein et al. |
| 2018/0270573 A1 | 9/2018 | Lang et al. |
| 2018/0286394 A1 | 10/2018 | Li et al. |
| 2018/0286414 A1 | 10/2018 | Ravindran et al. |
| 2018/0293221 A1 | 10/2018 | Finkelstein et al. |
| 2018/0301147 A1 | 10/2018 | Kim |
| 2018/0330727 A1 | 11/2018 | Tulli |
| 2018/0336892 A1 | 11/2018 | Kim et al. |
| 2018/0349093 A1 | 12/2018 | McCarty et al. |
| 2018/0350356 A1 | 12/2018 | Garcia |
| 2018/0350379 A1 | 12/2018 | Wung et al. |
| 2018/0352334 A1 | 12/2018 | Family et al. |
| 2018/0356962 A1 | 12/2018 | Corbin |
| 2018/0358019 A1 | 12/2018 | Mont-Reynaud |
| 2019/0019112 A1 | 1/2019 | Gelfenbeyn et al. |
| 2019/0035404 A1 | 1/2019 | Gabel et al. |
| 2019/0037173 A1 | 1/2019 | Lee |
| 2019/0043488 A1 | 2/2019 | Bocklet et al. |
| 2019/0051298 A1 | 2/2019 | Lee et al. |
| 2019/0066680 A1 | 2/2019 | Woo et al. |
| 2019/0066687 A1 | 2/2019 | Wood et al. |
| 2019/0066710 A1 | 2/2019 | Bryan et al. |
| 2019/0073999 A1 | 3/2019 | Prémont et al. |
| 2019/0081810 A1 | 3/2019 | Jung |
| 2019/0087455 A1 | 3/2019 | He et al. |
| 2019/0096408 A1 | 3/2019 | Li et al. |
| 2019/0122662 A1 | 4/2019 | Chang et al. |
| 2019/0156847 A1 | 5/2019 | Bryan et al. |
| 2019/0172467 A1 | 6/2019 | Kim et al. |
| 2019/0172476 A1 | 6/2019 | Wung et al. |
| 2019/0186937 A1 | 6/2019 | Sharifi et al. |
| 2019/0188328 A1 | 6/2019 | Oyenan et al. |
| 2019/0189117 A1 | 6/2019 | Kumar |
| 2019/0206391 A1 | 7/2019 | Busch et al. |
| 2019/0206405 A1 | 7/2019 | Gillespie et al. |
| 2019/0219976 A1 | 7/2019 | Giorgi et al. |
| 2019/0221206 A1 | 7/2019 | Chen et al. |
| 2019/0237089 A1 | 8/2019 | Shin |
| 2019/0244608 A1 | 8/2019 | Choi et al. |
| 2019/0251960 A1 | 8/2019 | Maker et al. |
| 2019/0281387 A1 | 9/2019 | Woo et al. |
| 2019/0287536 A1 | 9/2019 | Sharifi et al. |
| 2019/0288970 A1 | 9/2019 | Siddiq |
| 2019/0289367 A1 | 9/2019 | Siddiq |
| 2019/0295542 A1 | 9/2019 | Huang et al. |
| 2019/0295555 A1 | 9/2019 | Wilberding |
| 2019/0295556 A1 | 9/2019 | Wilberding |
| 2019/0311715 A1 | 10/2019 | Pfeffinger et al. |
| 2019/0311718 A1 | 10/2019 | Huber et al. |
| 2019/0311722 A1 | 10/2019 | Caldwell |
| 2019/0318729 A1 | 10/2019 | Chao et al. |
| 2019/0325870 A1 | 10/2019 | Mitic |
| 2019/0325888 A1 | 10/2019 | Geng |
| 2019/0341037 A1 | 11/2019 | Bromand et al. |
| 2019/0341038 A1 | 11/2019 | Bromand et al. |
| 2019/0347063 A1 | 11/2019 | Liu et al. |
| 2019/0348044 A1 | 11/2019 | Chun et al. |
| 2019/0362714 A1 | 11/2019 | Mori et al. |
| 2019/0364422 A1 | 11/2019 | Zhuo |
| 2019/0371310 A1 | 12/2019 | Fox et al. |
| 2019/0371324 A1 | 12/2019 | Powell et al. |
| 2019/0371342 A1 | 12/2019 | Tukka et al. |
| 2019/0392832 A1 | 12/2019 | Mitsui et al. |
| 2020/0043489 A1 | 2/2020 | Bradley et al. |
| 2020/0074990 A1 | 3/2020 | Kim et al. |
| 2020/0090647 A1 | 3/2020 | Kurtz |
| 2020/0098354 A1 | 3/2020 | Lin et al. |
| 2020/0098379 A1 | 3/2020 | Tai et al. |
| 2020/0105245 A1 | 4/2020 | Gupta et al. |
| 2020/0105264 A1 | 4/2020 | Jang et al. |
| 2020/0110571 A1 | 4/2020 | Liu et al. |
| 2020/0125162 A1 | 4/2020 | D'Amato et al. |
| 2020/0135194 A1 | 4/2020 | Jeong |
| 2020/0135224 A1 | 4/2020 | Bromand et al. |
| 2020/0152206 A1 | 5/2020 | Shen et al. |
| 2020/0184964 A1 | 6/2020 | Myers et al. |
| 2020/0211539 A1 | 7/2020 | Lee |
| 2020/0211550 A1 | 7/2020 | Pan et al. |
| 2020/0234709 A1 | 7/2020 | Kunitake |
| 2020/0244650 A1 | 7/2020 | Burris et al. |
| 2020/0251107 A1 | 8/2020 | Wang et al. |
| 2020/0265838 A1 | 8/2020 | Lee et al. |
| 2020/0310751 A1 | 10/2020 | Anand et al. |
| 2020/0342869 A1 | 10/2020 | Lee et al. |
| 2020/0366477 A1 | 11/2020 | Brown et al. |
| 2020/0409926 A1 | 12/2020 | Srinivasan et al. |
| 2021/0067867 A1 | 3/2021 | Kagoshima |
| 2021/0118439 A1 | 4/2021 | Schillmoeller et al. |
| 2021/0166680 A1 | 6/2021 | Jung et al. |
| 2021/0183366 A1 | 6/2021 | Reinspach et al. |
| 2021/0280185 A1 | 9/2021 | Tan et al. |
| 2021/0295849 A1 | 9/2021 | Van Der Ven et al. |
| 2021/0358481 A1 | 11/2021 | D'Amato et al. |
| 2022/0036882 A1 | 2/2022 | Ahn et al. |
| 2022/0050585 A1 | 2/2022 | Fettes et al. |
| 2022/0083136 A1 | 3/2022 | DeLeeuw |
| 2022/0301561 A1 | 9/2022 | Robert Jose et al. |

FOREIGN PATENT DOCUMENTS

| | | |
|---|---|---|
| CN | 1781291 A | 5/2006 |
| CN | 101427154 A | 5/2009 |
| CN | 102999161 A | 3/2013 |
| CN | 104115224 A | 10/2014 |
| CN | 104282305 A | 1/2015 |
| CN | 104520927 A | 4/2015 |
| CN | 104572009 A | 4/2015 |
| CN | 104885406 A | 9/2015 |
| CN | 104885438 A | 9/2015 |
| CN | 105162886 A | 12/2015 |
| CN | 105284168 A | 1/2016 |
| CN | 105389099 A | 3/2016 |
| CN | 105427861 A | 3/2016 |
| CN | 105453179 A | 3/2016 |
| CN | 105472191 A | 4/2016 |
| CN | 105493179 A | 4/2016 |
| CN | 105632486 A | 6/2016 |
| CN | 105679318 A | 6/2016 |
| CN | 106030699 A | 10/2016 |
| CN | 106796784 A | 5/2017 |
| CN | 106910500 A | 6/2017 |
| CN | 107122158 A | 9/2017 |
| CN | 107465974 A | 12/2017 |
| CN | 107644313 A | 1/2018 |
| CN | 107767863 A | 3/2018 |
| CN | 107832837 A | 3/2018 |
| CN | 107919116 A | 4/2018 |
| CN | 108028047 A | 5/2018 |
| CN | 108028048 A | 5/2018 |
| CN | 108198548 A | 6/2018 |
| CN | 109712626 A | 5/2019 |
| EP | 2051542 A1 | 4/2009 |
| EP | 2986034 A1 | 2/2016 |
| EP | 3133595 A1 | 2/2017 |
| GB | 2501367 A | 10/2013 |
| JP | S63301998 A | 12/1988 |
| JP | H0883091 A | 3/1996 |
| JP | 2004109361 A | 4/2004 |
| JP | 2004163590 A | 6/2004 |
| JP | 2007235875 A | 9/2007 |
| JP | 2008217444 A | 9/2008 |
| JP | 2014510481 A | 4/2014 |
| JP | 2016009193 A | 1/2016 |
| JP | 2017129860 A | 7/2017 |
| JP | 2017227912 A | 12/2017 |
| JP | 2018055259 A | 4/2018 |
| JP | 2019109510 A | 7/2019 |
| KR | 20140005410 A | 1/2014 |
| KR | 20140054643 A | 5/2014 |
| KR | 20140111859 A | 9/2014 |
| TW | 201629950 A | 8/2016 |
| WO | 03054854 A2 | 7/2003 |
| WO | 2008096414 A1 | 8/2008 |
| WO | 2015105788 A1 | 7/2015 |

(56) References Cited

FOREIGN PATENT DOCUMENTS

| WO | 2015133022 A1 | 9/2015 |
| --- | --- | --- |
| WO | 2015195216 A1 | 12/2015 |
| WO | 2016003509 A1 | 1/2016 |
| WO | 2016014686 A1 | 1/2016 |
| WO | 2016136062 A1 | 9/2016 |
| WO | 2018140777 A1 | 8/2018 |
| WO | 2019005772 A1 | 1/2019 |

OTHER PUBLICATIONS

Non-Final Office Action mailed on Apr. 5, 2023, issued in connection with U.S. Appl. No. 18/145,501, filed Dec. 22, 2022, 6 pages.
Non-Final Office Action mailed on Nov. 5, 2021, issued in connection with U.S. Appl. No. 16/153,530, filed Oct. 5, 2018, 21 pages.
Non-Final Office Action mailed on Dec. 7, 2021, issued in connection with U.S. Appl. No. 16/168,389, filed Oct. 23, 2018, 36 pages.
Non-Final Office Action mailed on Feb. 7, 2023, issued in connection with U.S. Appl. No. 17/303,001, filed May 18, 2021, 8 pages.
Non-Final Office Action mailed on Jan. 7, 2022, issued in connection with U.S. Appl. No. 17/135,123, filed Dec. 28, 2020, 16 pages.
Non-Final Office Action mailed on Mar. 7, 2022, issued in connection with U.S. Appl. No. 16/812,758, filed Mar. 9, 2020, 18 pages.
Non-Final Office Action mailed on Feb. 8, 2022, issued in connection with U.S. Appl. No. 16/806,747, filed Mar. 2, 2020, 17 pages.
Notice of Allowance mailed on Nov. 2, 2022, issued in connection with U.S. Appl. No. 16/989,805, filed Aug. 10, 2020, 5 pages.
Notice of Allowance mailed on Nov. 3, 2022, issued in connection with U.S. Appl. No. 17/448,015, filed Sep. 17, 2021, 7 pages.
Notice of Allowance mailed on Feb. 6, 2023, issued in connection with U.S. Appl. No. 17/077,974, filed Oct. 22, 2020, 7 pages.
Notice of Allowance mailed on Jan. 6, 2023, issued in connection with U.S. Appl. No. 17/896,129, filed Aug. 26, 2022, 13 pages.
Notice of Allowance mailed on Dec. 7, 2022, issued in connection with U.S. Appl. No. 17/315,599, filed May 10, 2021, 11 pages.
Notice of Allowance mailed on Feb. 8, 2023, issued in connection with U.S. Appl. No. 17/446,690, filed Sep. 1, 2021, 8 pages.
Notice of Allowance mailed on Jan. 9, 2023, issued in connection with U.S. Appl. No. 17/247,507, filed Dec. 14, 2020, 8 pages.
Notice of Allowance mailed on Mar. 9, 2023, issued in connection with U.S. Appl. No. 17/662,302, filed May 6, 2022, 7 pages.
Notice of Allowance mailed on Nov. 9, 2022, issued in connection with U.S. Appl. No. 17/385,542, filed Jul. 26, 2021, 8 pages.
Notice of Allowance mailed on Feb. 1, 2022, issued in connection with U.S. Appl. No. 16/439,046, filed Jun. 12, 2019, 9 pages.
Notice of Allowance mailed on Mar. 1, 2022, issued in connection with U.S. Appl. No. 16/879,549, filed May 20, 2020, 9 pages.
Notice of Allowance mailed on Sep. 1, 2021, issued in connection with U.S. Appl. No. 15/936,177, filed Mar. 26, 2018, 22 pages.
Notice of Allowance mailed on Jun. 10, 2022, issued in connection with U.S. Appl. No. 16/879,549, filed May 20, 2020, 8 pages.
Notice of Allowance mailed on May 11, 2022, issued in connection with U.S. Appl. No. 17/135,123, filed Dec. 28, 2020, 8 pages.
Notice of Allowance mailed on May 11, 2022, issued in connection with U.S. Appl. No. 17/145,667, filed Jan. 11, 2021, 7 pages.
Notice of Allowance mailed on May 11, 2023, issued in connection with U.S. Appl. No. 18/061,638, filed Dec. 5, 2022, 15 pages.
Notice of Allowance mailed on Jul. 12, 2022, issued in connection with U.S. Appl. No. 16/907,953, filed Jun. 22, 2020, 8 pages.
Notice of Allowance mailed on Jul. 12, 2022, issued in connection with U.S. Appl. No. 17/391,404, filed Aug. 2, 2021, 13 pages.
Notice of Allowance mailed on Apr. 13, 2022, issued in connection with U.S. Appl. No. 17/236,559, filed Apr. 21, 2021, 7 pages.
Notice of Allowance mailed on Dec. 13, 2021, issued in connection with U.S. Appl. No. 16/879,553, filed May 20, 2020, 15 pages.
Notice of Allowance mailed on Feb. 13, 2023, issued in connection with U.S. Appl. No. 18/045,360, filed Oct. 10, 2022, 9 pages.
Notice of Allowance mailed on Jan. 14, 2022, issued in connection with U.S. Appl. No. 16/966,397, filed Jul. 30, 2020, 5 pages.
Notice of Allowance mailed on Aug. 15, 2022, issued in connection with U.S. Appl. No. 17/101,949, filed Nov. 23, 2020, 11 pages.
Notice of Allowance mailed on Feb. 15, 2023, issued in connection with U.S. Appl. No. 17/659,613, filed Apr. 18, 2022, 21 pages.
Notice of Allowance mailed on Oct. 15, 2021, issued in connection with U.S. Appl. No. 16/213,570, filed Dec. 7, 2018, 8 pages.
Notice of Allowance mailed on Sep. 15, 2021, issued in connection with U.S. Appl. No. 16/685,135, filed Nov. 15, 2019, 10 pages.
Notice of Allowance mailed on Sep. 15, 2022, issued in connection with U.S. Appl. No. 16/736,725, filed Jan. 1, 2020, 11 pages.
Notice of Allowance mailed on Aug. 17, 2022, issued in connection with U.S. Appl. No. 17/135,347, filed Dec. 28, 2020, 14 pages.
Notice of Allowance mailed on Nov. 17, 2022, issued in connection with U.S. Appl. No. 17/486,222, filed Sep. 27, 2021, 10 pages.
Notice of Allowance mailed on Jul. 18, 2022, issued in connection with U.S. Appl. No. 17/222,151, filed Apr. 5, 2021, 5 pages.
Notice of Allowance mailed on Dec. 2, 2021, issued in connection with U.S. Appl. No. 16/841,116, filed Apr. 6, 2020, 5 pages.
Notice of Allowance mailed on Dec. 20, 2022, issued in connection with U.S. Appl. No. 16/806,747, filed Mar. 2, 2020, 5 pages.
Notice of Allowance mailed on Jan. 20, 2023, issued in connection with U.S. Appl. No. 16/915,234, filed Jun. 29, 2020, 6 pages.
Notice of Allowance mailed on Jun. 20, 2022, issued in connection with U.S. Appl. No. 16/947,895, filed Aug. 24, 2020, 7 pages.
Notice of Allowance mailed on Mar. 20, 2023, issued in connection with U.S. Appl. No. 17/562,412, filed Dec. 27, 2021, 9 pages.
Notice of Allowance mailed on Oct. 20, 2021, issued in connection with U.S. Appl. No. 16/439,032, filed Jun. 12, 2019, 8 pages.
Notice of Allowance mailed on Dec. 21, 2021, issued in connection with U.S. Appl. No. 16/271,550, filed Feb. 8, 2019, 11 pages.
Notice of Allowance mailed on Mar. 21, 2023, issued in connection with U.S. Appl. No. 17/353,254, filed Jun. 21, 2021, 8 pages.
Notice of Allowance mailed on Nov. 21, 2022, issued in connection with U.S. Appl. No. 17/454,676, filed Nov. 12, 2021, 8 pages.
Notice of Allowance mailed on Sep. 21, 2022, issued in connection with U.S. Appl. No. 17/128,949, filed Dec. 21, 2020, 8 pages.
Advisory Action mailed on Nov. 7, 2022, issued in connection with U.S. Appl. No. 16/168,389, filed Oct. 23, 2018, 4 pages.
Advisory Action mailed on Feb. 28, 2022, issued in connection with U.S. Appl. No. 16/813,643, filed Mar. 9, 2020, 3 pages.
Advisory Action mailed on Sep. 8, 2021, issued in connection with U.S. Appl. No. 16/168,389, filed Oct. 23, 2018, 4 pages.
Audhkhasi Kartik et al. End-to-end ASR-free keyword search from speech. 2017 IEEE International Conference on Acoustics, Speech and Signal Processing, Mar. 5, 2017, 7 pages.
Australian Patent Office, Australian Examination Report Action mailed on Nov. 10, 2022, issued in connection with Australian Application No. 2018312989, 2 pages.
Australian Patent Office, Australian Examination Report Action mailed on May 19, 2022, issued in connection with Australian Application No. 2021212112, 2 pages.
Australian Patent Office, Australian Examination Report Action mailed on Sep. 28, 2022, issued in connection with Australian Application No. 2018338812, 3 pages.
Australian Patent Office, Australian Examination Report Action mailed on Mar. 4, 2022, issued in connection with Australian Application No. 2021202786, 2 pages.
Canadian Patent Office, Canadian Examination Report mailed on Dec. 1, 2021, issued in connection with Canadian Application No. 3096442, 4 pages.
Canadian Patent Office, Canadian Examination Report mailed on Sep. 14, 2022, issued in connection with Canadian Application No. 3067776, 4 pages.
Canadian Patent Office, Canadian Examination Report mailed on Oct. 19, 2022, issued in connection with Canadian Application No. 3123601, 5 pages.
Canadian Patent Office, Canadian Examination Report mailed on Nov. 2, 2021, issued in connection with Canadian Application No. 3067776, 4 pages.
Canadian Patent Office, Canadian Examination Report mailed on Oct. 26, 2021, issued in connection with Canadian Application No. 3072492, 3 pages.

(56) References Cited

OTHER PUBLICATIONS

Canadian Patent Office, Canadian Examination Report mailed on Mar. 29, 2022, issued in connection with Canadian Application No. 3111322, 3 pages.
Canadian Patent Office, Canadian Examination Report mailed on Jun. 7, 2022, issued in connection with Canadian Application No. 3105494, 5 pages.
Chinese Patent Office, First Office Action and Translation mailed on Jun. 1, 2021, issued in connection with Chinese Application No. 201980089721.5, 21 pages.
Chinese Patent Office, First Office Action and Translation mailed on Feb. 9, 2023, issued in connection with Chinese Application No. 201880076788.0, 13 pages.
Chinese Patent Office, First Office Action and Translation mailed on Oct. 9, 2022, issued in connection with Chinese Application No. 201780056695.7, 10 pages.
Chinese Patent Office, First Office Action and Translation mailed on Dec. 1, 2021, issued in connection with Chinese Application No. 201780077204.7, 11 pages.
Chinese Patent Office, First Office Action and Translation mailed on Nov. 10, 2022, issued in connection with Chinese Application No. 201980070006.7, 15 pages.
Chinese Patent Office, First Office Action and Translation mailed on Jan. 19, 2023, issued in connection with Chinese Application No. 201880064916.X, 10 pages.
Chinese Patent Office, First Office Action and Translation mailed on Sep. 19, 2022, issued in connection with Chinese Application No. 201980056604.9, 13 pages.
Chinese Patent Office, First Office Action and Translation mailed on Dec. 20, 2021, issued in connection with Chinese Application No. 202010302650.7, 10 pages.
Chinese Patent Office, First Office Action and Translation mailed on Nov. 25, 2022, issued in connection with Chinese Application No. 201780056321.5, 8 pages.
Chinese Patent Office, First Office Action and Translation mailed on Feb. 27, 2023, issued in connection with Chinese Application No. 201980003798.6, 12 pages.
Chinese Patent Office, First Office Action and Translation mailed on Dec. 30, 2022, issued in connection with Chinese Application No. 201880076775.3, 10 pages.
Chinese Patent Office, Second Office Action and Translation mailed on Mar. 3, 2022, issued in connection with Chinese Application No. 201880077216.4, 11 pages.
Chinese Patent Office, Second Office Action and Translation mailed on Apr. 1, 2023, issued in connection with Chinese Application No. 201980056604.9, 11 pages.
Chinese Patent Office, Second Office Action mailed on Dec. 21, 2022, issued in connection with Chinese Application No. 201980089721.5, 12 pages.
Chung et al. Empirical Evaluation of Gated Recurrent Neural Network on Sequence Modeling. Dec. 11, 2014, 9 pages.
Couke et al. Efficient Keyword Spotting using Dilated Convolutions and Gating, arXiv:1811.07684v2, Feb. 18, 2019, 5 pages.
European Patent Office, Decision to Refuse European Patent Application mailed on May 30, 2022, issued in connection with European Application No. 17200837.7, 4 pages.
European Patent Office, European EPC Article 94.3 mailed on Feb. 10, 2023, issued in connection with European Application No. 19729968.8, 7 pages.
European Patent Office, European EPC Article 94.3 mailed on Mar. 11, 2022, issued in connection with European Application No. 19731415.6, 7 pages.
European Patent Office, European EPC Article 94.3 mailed on Nov. 11, 2021, issued in connection with European Application No. 19784172.9, 5 pages.
European Patent Office, European EPC Article 94.3 mailed on May 2, 2022, issued in connection with European Application No. 20185599.6, 7 pages.
European Patent Office, European EPC Article 94.3 mailed on Jun. 21, 2022, issued in connection with European Application No. 19780508.8, 5 pages.
European Patent Office, European EPC Article 94.3 mailed on Feb. 23, 2023, issued in connection with European Application No. 19839734.1, 8 pages.
European Patent Office, European EPC Article 94.3 mailed on Nov. 28, 2022, issued in connection with European Application No. 18789515.6, 7 pages.
European Patent Office, European EPC Article 94.3 mailed on Mar. 3, 2022, issued in connection with European Application No. 19740292.8, 10 pages.
European Patent Office, European EPC Article 94.3 mailed on Jun. 30, 2022, issued in connection with European Application No. 19765953.5, 4 pages.
European Patent Office, European Extended Search Report mailed on Oct. 7, 2021, issued in connection with European Application No. 21193616.6, 9 pages.
European Patent Office, European Extended Search Report mailed on Oct. 7, 2022, issued in connection with European Application No. 22182193.7, 8 pages.
European Patent Office, European Extended Search Report mailed on Apr. 22, 2022, issued in connection with European Application No. 21195031.6, 14 pages.
European Patent Office, European Extended Search Report mailed on Jun. 23, 2022, issued in connection with European Application No. 22153180.9, 6 pages.
European Patent Office, European Extended Search Report mailed on Jun. 30, 2022, issued in connection with European Application No. 21212763.3, 9 pages.
European Patent Office, European Extended Search Report mailed on Jul. 8, 2022, issued in connection with European Application No. 22153523.0, 9 pages.
European Patent Office, European Search Report mailed on Mar. 1, 2022, issued in connection with European Application No. 21180778.9, 9 pages.
European Patent Office, European Search Report mailed on Oct. 4, 2022, issued in connection with European Application No. 22180226.7, 6 pages.
European Patent Office, Extended Search Report mailed on Aug. 13, 2021, issued in connection with European Patent Application No. 21164130.3, 11 pages.
Notice of Allowance mailed on Nov. 22, 2021, issued in connection with U.S. Appl. No. 16/834,483, filed Mar. 30, 2020, 10 pages.
Notice of Allowance mailed on Sep. 22, 2022, issued in connection with U.S. Appl. No. 17/163,506, filed Jan. 31, 2021, 13 pages.
Notice of Allowance mailed on Sep. 22, 2022, issued in connection with U.S. Appl. No. 17/248,427, filed Jan. 25, 2021, 9 pages.
Notice of Allowance mailed on Aug. 23, 2021, issued in connection with U.S. Appl. No. 16/109,375, filed Aug. 22, 2018, 10 pages.
Notice of Allowance mailed on Feb. 23, 2023, issued in connection with U.S. Appl. No. 17/532,674, filed Nov. 22, 2021, 10 pages.
Notice of Allowance mailed on Mar. 24, 2022, issued in connection with U.S. Appl. No. 16/378,516, filed Apr. 8, 2019, 7 pages.
Notice of Allowance mailed on Oct. 25, 2021, issued in connection with U.S. Appl. No. 16/723,909, filed Dec. 20, 2019, 11 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Aug. 26, 2022, issued in connection with U.S. Appl. No. 17/145,667, filed Jan. 11, 2021, 8 pages.
Notice of Allowance mailed on Oct. 26, 2022, issued in connection with U.S. Appl. No. 17/486,574, filed Sep. 27, 2021, 11 pages.
Notice of Allowance mailed on Jun. 27, 2022, issued in connection with U.S. Appl. No. 16/812,758, filed Mar. 9, 2020, 16 pages.
Notice of Allowance mailed on Sep. 28, 2022, issued in connection with U.S. Appl. No. 17/444,043, filed Jul. 29, 2021, 17 pages.
Notice of Allowance mailed on Dec. 29, 2022, issued in connection with U.S. Appl. No. 17/327,911, filed May 24, 2021, 14 pages.
Notice of Allowance mailed on Jul. 29, 2022, issued in connection with U.S. Appl. No. 17/236,559, filed Apr. 21, 2021, 6 pages.

(56) References Cited

OTHER PUBLICATIONS

Notice of Allowance mailed on Mar. 29, 2023, issued in connection with U.S. Appl. No. 17/722,438, filed Apr. 18, 2022, 7 pages.
Notice of Allowance mailed on Sep. 29, 2021, issued in connection with U.S. Appl. No. 16/876,493, filed May 18, 2020, 5 pages.
Notice of Allowance mailed on Mar. 3, 2022, issued in connection with U.S. Appl. No. 16/679,538, filed Nov. 11, 2019, 7 pages.
Notice of Allowance mailed on Mar. 30, 2023, issued in connection with U.S. Appl. No. 17/303,066, filed May 19, 2021, 7 pages.
Notice of Allowance mailed on Mar. 31, 2023, issued in connection with U.S. Appl. No. 17/303,735, filed Jun. 7, 2021, 19 pages.
Notice of Allowance mailed on Apr. 5, 2023, issued in connection with U.S. Appl. No. 17/549,253, filed Dec. 13, 2021, 10 pages.
Notice of Allowance mailed on Mar. 6, 2023, issued in connection with U.S. Appl. No. 17/449,926, filed Oct. 4, 2021, 8 pages.
Notice of Allowance mailed on Apr. 8, 2022, issued in connection with U.S. Appl. No. 16/813,643, filed Mar. 9, 2020, 7 pages.
Notice of Allowance mailed on Nov. 8, 2021, issued in connection with U.S. Appl. No. 17/008,104, filed Aug. 31, 2020, 9 pages.
Notice of Allowance mailed on Dec. 9, 2021, issued in connection with U.S. Appl. No. 16/845,946, filed Apr. 10, 2020, 10 pages.
Notice of Allowance mailed on Feb. 9, 2022, issued in connection with U.S. Appl. No. 17/247,736, filed Dec. 21, 2020, 8 pages.
Pre-Appeal Brief Decision mailed on Jan. 18, 2022, issued in connection with U.S. Appl. No. 16/806,747, filed Mar. 2, 2020, 2 pages.
Rybakov et al. Streaming keyword spotting on mobile devices, arXiv:2005.06720v2, Jul. 29, 2020, 5 pages.
Shan et al. Attention-based End-to-End Models for Small-Footprint Keyword Spotting, arXiv:1803.10916v1, Mar. 29, 2018, 5 pages.
Simon Doclo et al. Combined Acoustic Echo and Noise Reduction Using GSVD-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14&q=COMBINED+ACOUSTIC+ECHO+AND+NOISE+REDUCTION+USING+GSVD-BASED+OPTIMAL+FILTERING&btnG=.
Snips: How to Snips—Assistant creation Installation, Jun. 26, 2017, 6 pages.
Speidel, Hans. Chatbot Training: How to use training data to provide fully automated customer support. Retrieved from the Internet: URL: https://www.crowdguru.de/wp-content/uploads/Case-Study-Chatbox-training-How-to-use-training-data-to-provide-fully-automated-customer-support.pdf. Jun. 29, 2017, 4 pages.
Tsung-Hsien Wen et al: "A Network-based End-to-End Trainable Task-oriented Dialogue System", CORR (ARXIV), vol. 1604.04562v1, Apr. 15, 2016 (Apr. 15, 2016), pp. 1-11.
Wen et al. A Network-based End-to-End Trainable Task-oriented Dialogue System, CORR (ARXIV), Apr. 15, 2016, 11 pages.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.
Wolf et al. On the potential of channel selection for recognition of reverberated speech with multiple microphones. Interspeech, TALP Research Center, Jan. 2010, 5 pages.
Wolfel et al. Multi-source far-distance microphone selection and combination for automatic transcription of lectures, INTERSPEECH 2006—ICSLP, Jan. 2006, 5 pages.
Kiaoguang et al. "Robust Small-Footprint Keyword Spotting Using Sequence-To-Sequence Model with Connectionist Temporal Classifier", 2019 IEEE, Sep. 28, 2019, 5 pages.
Zhang et al. Noise Robust Speech Recognition Using Multi-Channel Based Channel Selection And Channel Weighting. The Institute of Electronics, Information and Communication Engineers, arXiv:1604.03276v1 [cs.SD] Jan. 1, 2010, 8 pages.

European Patent Office, Extended Search Report mailed on May 16, 2018, issued in connection with European Patent Application No. 17200837.7, 11 pages.
European Patent Office, Extended Search Report mailed on May 29, 2020, issued in connection with European Patent Application No. 19209389.6, 8 pages.
European Patent Office, Summons to Attend Oral Proceedings mailed on Jul. 15, 2022, issued in connection with European Application No. 17792272.1, 11 pages.
European Patent Office, Summons to Attend Oral Proceedings mailed on Feb. 4, 2022, issued in connection with European Application No. 17757075.1, 10 pages.
European Patent Office, Summons to Attend Oral Proceedings mailed on Dec. 9, 2021, issued in connection with European Application No. 17200837.7, 10 pages.
Final Office Action mailed on Jun. 1, 2022, issued in connection with U.S. Appl. No. 16/806,747, filed Mar. 2, 2020, 20 pages.
Final Office Action mailed on Aug. 17, 2022, issued in connection with U.S. Appl. No. 16/179,779, filed Nov. 2, 2018, 26 pages.
Final Office Action mailed on Dec. 17, 2021, issued in connection with U.S. Appl. No. 16/813,643, filed Mar. 9, 2020, 12 pages.
Final Office Action mailed on May 17, 2023, issued in connection with U.S. Appl. No. 16/168,389, filed Oct. 23, 2018, 44 pages.
Final Office Action mailed on Mar. 21, 2022, issued in connection with U.S. Appl. No. 16/153,530, filed Oct. 6, 2018, 23 pages.
Final Office Action mailed on Aug. 22, 2022, issued in connection with U.S. Appl. No. 16/168,389, filed Oct. 23, 2018, 37 pages.
Final Office Action mailed on Jul. 27, 2022, issued in connection with U.S. Appl. No. 16/989,350, filed Aug. 10, 2020, 15 pages.
Final Office Action mailed on Mar. 29, 2023, issued in connection with U.S. Appl. No. 17/549,034, filed Dec. 13, 2021, 21 pages.
Final Office Action mailed on Nov. 29, 2021, issued in connection with U.S. Appl. No. 17/236,559, filed Apr. 21, 2021, 11 pages.
Final Office Action mailed on Oct. 4, 2021, issued in connection with U.S. Appl. No. 16/806,747, filed Mar. 2, 2020, 17 pages.
Final Office Action mailed on Jun. 7, 2022, issued in connection with U.S. Appl. No. 16/736,725, filed Jan. 7, 2020, 14 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIVE+FILTERING+FOR+MIMO+SYSTEMS+WITH+APPLICATION+TO+ACOUSTIC+ECHO+CANCELLATION&btnG=.
International Bureau, International Preliminary Report on Patentability and Written Opinion, mailed on Aug. 10, 2021, issued in connection with International Application No. PCT/US2020/017150, filed on Feb. 7, 2020, 20 pages.
International Bureau, International Preliminary Report on Patentability and Written Opinion, mailed on Mar. 10, 2020, issued in connection with International Application No. PCT/US2018/050050, filed on Sep. 7, 2018, 7 pages.
International Bureau, International Preliminary Report on Patentability and Written Opinion, mailed on Jan. 15, 2019, issued in connection with International Application No. PCT/US2017/042170, filed on Jul. 14, 2017, 7 pages.
International Bureau, International Preliminary Report on Patentability and Written Opinion, mailed on Jan. 15, 2019, issued in connection with International Application No. PCT/US2017/042227, filed on Jul. 14, 2017, 7 pages.
International Bureau, International Preliminary Report on Patentability and Written Opinion, mailed on Mar. 31, 2020, issued in connection with International Application No. PCT/US2018/053517, filed on Sep. 28, 2018, 10 pages.
International Bureau, International Preliminary Report on Patentability and Written Opinion, mailed on Feb. 5, 2019, issued in connection with International Application No. PCT/US2017/045521, filed on Aug. 4, 2017, 7 pages.
International Bureau, International Preliminary Report on Patentability and Written Opinion, mailed on Feb. 5, 2019, issued in connection with International Application No. PCT/US2017/045551, filed on Aug. 4, 2017, 9 pages.

(56) References Cited

OTHER PUBLICATIONS

International Bureau, International Preliminary Report on Patentability, mailed on Jul. 21, 2022, issued in connection with International Application No. PCT/US2021/070007, filed on Jan. 6, 2021, 8 pages.
International Bureau, International Preliminary Report on Patentability, mailed on Apr. 26, 2022, issued in connection with International Application No. PCT/US2020/056632, filed on Oct. 21, 2020, 7 pages.
International Bureau, International Search Report and Written Opinion mailed on Nov. 14, 2017, issued in connection with International Application No. PCT/US2017/045521, filed on Aug. 4, 2017, 10 pages.
International Bureau, International Search Report and Written Opinion mailed on Mar. 2, 2020, issued in connection with International Application No. PCT/US2019/064907, filed on Dec. 6, 2019, 9 pages.
International Bureau, International Search Report and Written Opinion mailed on Mar. 20, 2023, issued in connection with International Application No. PCT/US2022/045399, filed on Sep. 30, 2022, 25 pages.
International Bureau, International Search Report and Written Opinion mailed on Dec. 6, 2018, issued in connection with International Application No. PCT/US2018/050050, filed on Sep. 7, 2018, 9 pages.
International Bureau, International Search Report and Written Opinion mailed on Oct. 6, 2017, issued in connection with International Application No. PCT/US2017/045551, filed on Aug. 4, 2017, 12 pages.
International Searching Authority, International Search Report and Written Opinion mailed on Feb. 8, 2021, issued in connection with International Application No. PCT/EP2020/082243, filed on Nov. 16, 2020, 10 pages.
International Searching Authority, International Search Report and Written Opinion mailed on Feb. 12, 2021, issued in connection with International Application No. PCT/US2020/056632, filed on Oct. 21, 2020, 10 pages.
International Searching Authority, International Search Report and Written Opinion mailed on Apr. 23, 2021, issued in connection with International Application No. PCT/US2020/066231, filed on Dec. 18, 2020, 9 pages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on Oct. 4, 2022, issued in connection with Japanese Patent Application No. 2021-535871, 6 pages.
Japanese Patent Office, Decision of Refusal and Translation mailed on Jul. 26, 2022, issued in connection with Japanese Patent Application No. 2020-513852, 10 pages.
Japanese Patent Office, Non-Final Office Action mailed on Apr. 4, 2023, issued in connection with Japanese Patent Application No. 2021-573944, 5 pages.
Japanese Patent Office, Notice of Reasons for Refusal and Translation mailed on Sep. 13, 2022, issued in connection with Japanese Patent Application No. 2021-163622, 12 pages.
Japanese Patent Office, Notice of Reasons for Refusal and Translation mailed on Nov. 28, 2021, issued in connection with Japanese Patent Application No. 2020-550102, 9 pages.
Japanese Patent Office, Office Action and Translation mailed on Nov. 15, 2022, issued in connection with Japanese Patent Application No. 2021-146144, 9 pages.
Japanese Patent Office, Office Action mailed on Dec. 7, 2021, issued in connection with Japanese Patent Application No. 2020-513852, 6 pages.
Japanese Patent Office, Office Action mailed on Nov. 29, 2022, issued in connection with Japanese Patent Application No. 2021-181224, 6 pages.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Kim et al. Character-Aware Neural Language Models. Retrieved from the Internet: URL: https://arxiv.org/pdf/1508.06615v3.pdf, Oct. 16, 2015, 9 pages.
Korean Patent Office, Korean Examination Report and Translation mailed on Apr. 10, 2023, issued in connection with Korean Application No. 10-2022-7024007, 8 pages.
Korean Patent Office, Korean Examination Report and Translation mailed on Oct. 13, 2022, issued in connection with Korean Application No. 10-2021-7030939, 4 pages.
Korean Patent Office, Korean Examination Report and Translation mailed on Apr. 19, 2022, issued in connection with Korean Application No. 10-2021-7008937, 14 pages.
Korean Patent Office, Korean Examination Report and Translation mailed on Nov. 25, 2021, issued in connection with Korean Application No. 10-2021-7008937, 14 pages.
Korean Patent Office, Korean Examination Report and Translation mailed on Jul. 26, 2022, issued in connection with Korean Application No. 10-2022-7016656, 17 pages.
Korean Patent Office, Korean Examination Report and Translation mailed on Dec. 27, 2021, issued in connection with Korean Application No. 10-2021-7008937, 22 pages.
Korean Patent Office, Korean Examination Report and Translation mailed on Mar. 31, 2023, issued in connection with Korean Application No. 10-2022-7016656, 7 pages.
Korean Patent Office, Korean Examination Report and Translation mailed on Oct. 31, 2021, issued in connection with Korean Application No. 10-2022-7024007, 10 pages.
Korean Patent Office, Korean Office Action and Translation mailed on Oct. 14, 2021, issued in connection with Korean Application No. 10-2020-7011843, 29 pages.
Korean Patent Office, Office Action and Translation mailed on Feb. 27, 2023, issued in connection with Korean Application No. 10-2022-7021879, 5 pages.
Lengerich et al. An End-to-End Architecture for Keyword Spotting and Voice Activity Detection, arXiv:1611.09405v1, Nov. 28, 2016, 5 pages.
Mathias Wolfel. Channel Selection by Class Separability Measures for Automatic Transcriptions on Distant Microphones, INTERSPEECH 2007 10.21437/Interspeech.2007-255, 4 pages.
Matrix—The Ultimate Development Board Sep. 14, 2019 Matrix-The Ultimate Development Board Sep. 14, 2019 https://web.archive.org/web/20190914035838/https-//www.matrix.one/ , 1 page.
Molina et al., "Maximum Entropy-Based Reinforcement Learning Using a Confidence Measure in Speech Recognition for Telephone Speech," in IEEE Transactions on Audio, Speech, and Language Processing, vol. 18, No. 5, pp. 1041-1052, Jul. 2010, doi: 10.1109/TASL.2009.2032618. [Retrieved online] URLhttps://ieeexplore.ieee.org/document/5247099?partnum=5247099&searchProductType=IEEE%20Journals%20Transactions.
Non-Final Office Action mailed on Feb. 2, 2023, issued in connection with U.S. Appl. No. 17/305,698, filed Jul. 13, 2021, 16 pages.
Non-Final Office Action mailed on Dec. 5, 2022, issued in connection with U.S. Appl. No. 17/662,302, filed May 6, 2022, 12 pages.
Non-Final Office Action mailed on Oct. 5, 2022, issued in connection with U.S. Appl. No. 17/449,926, filed Oct. 4, 2021, 11 pages.
Non-Final Office Action mailed on Feb. 11, 2022, issued in connection with U.S. Appl. No. 17/145,667, filed Jan. 11, 2021, 9 pages.
Non-Final Office Action mailed on Apr. 12, 2023, issued in connection with U.S. Appl. No. 17/878,649, filed Aug. 1, 2022, 16 pages.
Non-Final Office Action mailed on Oct. 13, 2021, issued in connection with U.S. Appl. No. 16/679,538, filed Nov. 11, 2019, 8 pages.
Non-Final Office Action mailed on Nov. 14, 2022, issued in connection with U.S. Appl. No. 17/077,974, filed Oct. 22, 2020, 6 pages.
Non-Final Office Action mailed on Sep. 14, 2022, issued in connection with U.S. Appl. No. 17/446,690, filed Sep. 1, 2021, 10 pages.

(56) References Cited

OTHER PUBLICATIONS

Non-Final Office Action mailed on Aug. 15, 2022, issued in connection with U.S. Appl. No. 17/448,015, filed Sep. 17, 2021, 12 pages.
Non-Final Office Action mailed on Dec. 15, 2022, issued in connection with U.S. Appl. No. 17/549,253, filed Dec. 13, 2021, 10 pages.
Non-Final Office Action mailed on Feb. 15, 2023, issued in connection with U.S. Appl. No. 17/453,632, filed Nov. 4, 2021, 12 pages.
Non-Final Office Action mailed on Sep. 15, 2022, issued in connection with U.S. Appl. No. 17/247,507, filed Dec. 14, 2020, 9 pages.
Non-Final Office Action mailed on Sep. 15, 2022, issued in connection with U.S. Appl. No. 17/327,911, filed May 24, 2021, 44 pages.
Non-Final Office Action mailed on Feb. 16, 2023, issued in connection with U.S. Appl. No. 17/305,920, filed Jul. 16, 2021, 12 pages.
Non-Final Office Action mailed on Sep. 16, 2021, issued in connection with U.S. Appl. No. 16/879,553, filed May 20, 2020, 24 pages.
Non-Final Office Action mailed on Aug. 17, 2021, issued in connection with U.S. Appl. No. 17/236,559, filed Apr. 21, 2021, 10 pages.
Non-Final Office Action mailed on Aug. 18, 2021, issued in connection with U.S. Appl. No. 16/845,946, filed Apr. 10, 2020, 14 pages.
Non-Final Office Action mailed on Oct. 18, 2022, issued in connection with U.S. Appl. No. 16/949,973, filed Nov. 23, 2020, 31 pages.
Non-Final Office Action mailed on Sep. 19, 2022, issued in connection with U.S. Appl. No. 17/385,542, filed Jul. 26, 2021, 9 pages.
Non-Final Office Action mailed on Sep. 2, 2021, issued in connection with U.S. Appl. No. 16/947,895, filed Aug. 24, 2020, 16 pages.
Non-Final Office Action mailed on Apr. 20, 2023, issued in connection with U.S. Appl. No. 18/061,570, filed Dec. 5, 2022, 12 pages.
Non-Final Office Action mailed on Oct. 20, 2022, issued in connection with U.S. Appl. No. 17/532,674, filed Nov. 22, 2021, 52 pages.
Non-Final Office Action mailed on Dec. 22, 2022, issued in connection with U.S. Appl. No. 16/168,389, filed Oct. 23, 2018, 39 pages.
Non-Final Office Action mailed on Mar. 23, 2022, issued in connection with U.S. Appl. No. 16/907,953, filed Jun. 22, 2020, 7 pages.
Non-Final Office Action mailed on Sep. 23, 2022, issued in connection with U.S. Appl. No. 16/153,530, filed Oct. 5, 2018, 25 pages.
Non-Final Office Action mailed on Apr. 24, 2023, issued in connection with U.S. Appl. No. 17/532,744, filed Nov. 22, 2021, 18 pages.
Non-Final Office Action mailed on May 24, 2022, issued in connection with U.S. Appl. No. 17/101,949, filed Nov. 23, 2020, 10 pages.
Non-Final Office Action mailed on Apr. 25, 2023, issued in connection with U.S. Appl. No. 17/536,572, filed Nov. 29, 2021, 8 pages.
Non-Final Office Action mailed on Apr. 25, 2023, issued in connection with U.S. Appl. No. 17/656,794, filed Mar. 28, 2022, 22 pages.
Non-Final Office Action mailed on Oct. 25, 2022, issued in connection with U.S. Appl. No. 17/549,034, filed Dec. 13, 2021, 20 pages.
Non-Final Office Action mailed on May 26, 2022, issued in connection with U.S. Appl. No. 16/989,805, filed Aug. 10, 2020, 14 pages.
Non-Final Office Action mailed on Oct. 26, 2021, issued in connection with U.S. Appl. No. 16/736,725, filed Jan. 7, 2020, 12 pages.
Non-Final Office Action mailed on Feb. 27, 2023, issued in connection with U.S. Appl. No. 17/493,430, filed Oct. 4, 2021, 17 pages.
Non-Final Office Action mailed on Feb. 28, 2023, issued in connection with U.S. Appl. No. 17/548,921, filed Dec. 13, 2021, 12 pages.
Non-Final Office Action mailed on Mar. 28, 2022, issued in connection with U.S. Appl. No. 17/222,151, filed Apr. 5, 2021, 5 pages.
Non-Final Office Action mailed on Oct. 28, 2021, issued in connection with U.S. Appl. No. 16/378,516, filed Apr. 8, 2019, 10 pages.
Non-Final Office Action mailed on Oct. 28, 2021, issued in connection with U.S. Appl. No. 17/247,736, filed Dec. 21, 2020, 12 pages.
Non-Final Office Action mailed on Nov. 29, 2021, issued in connection with U.S. Appl. No. 16/989,350, filed Aug. 10, 2020, 15 pages.
Non-Final Office Action mailed on Sep. 30, 2022, issued in connection with U.S. Appl. No. 17/353,254, filed Jun. 21, 2021, 22 pages.
Non-Final Office Action mailed on Jan. 4, 2022, issued in connection with U.S. Appl. No. 16/879,549, filed May 20, 2020, 14 pages.
Non-Final Office Action mailed on Nov. 4, 2022, issued in connection with U.S. Appl. No. 17/445,272, filed Aug. 17, 2021, 22 pages.

* cited by examiner

NETWORK MICROPHONE DEVICES WITH AUTOMATIC DO NOT DISTURB ACTUATION CAPABILITIES

CROSS-REFERENCE TO RELATED APPLICATIONS

The present application is a continuation of U.S. application Ser. No. 17/135,123, titled "Network Microphone Devices with Automatic Do Not Disturb Actuation Capabilities," filed on Dec. 28, 2020; U.S. application Ser. No. 17/135,123 is a continuation of U.S. application Ser. No. 16/214,711, titled "Network Microphone Devices with Automatic Do Not Disturb Actuation Capabilities," filed on Dec. 10, 2018, and issued as U.S. Pat. No. 10,880,650 on Dec. 29, 2020; U.S. application Ser. No. 16/214,711 claims priority to 62/596,902, titled "Network Microphone Devices with Automatic Do Not Disturb Actuation Capabilities," filed on Dec. 10, 2017. The entire contents of U.S. application Ser. Nos. 17/135,123; 16/214,711; and 62/596,902 are incorporated herein by reference.

FIELD OF THE DISCLOSURE

The disclosure is related to consumer goods and, more particularly, to methods, systems, products, features, services, and other elements directed to voice control of media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
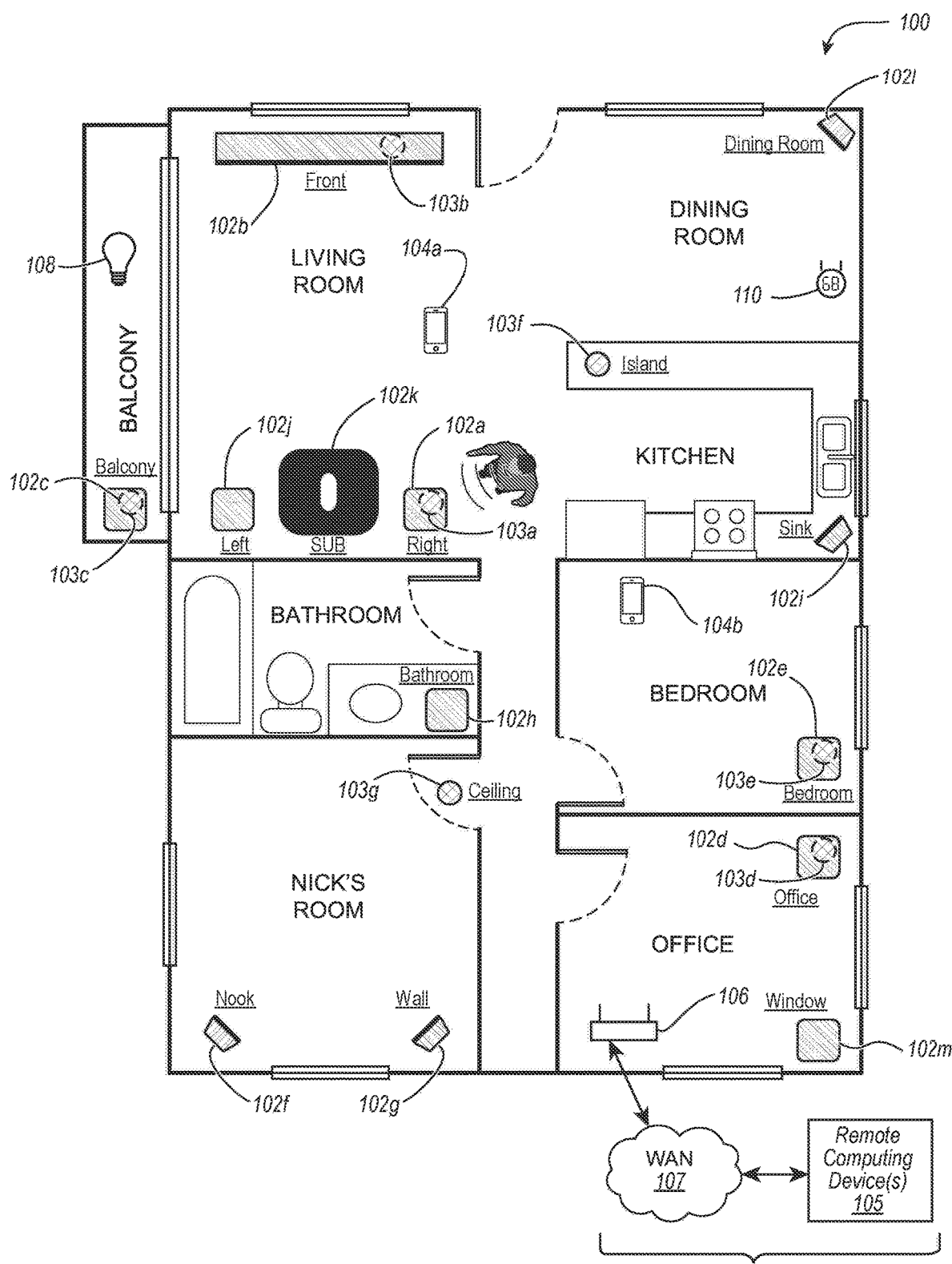
FIG. 1 shows a media playback system in which certain embodiments may be practiced.

The drawings are for purposes of illustrating example embodiments, but it is understood that the inventions are not limited to the arrangements and instrumentalities shown in the drawings. In the drawings, identical reference numbers identify at least generally similar elements. To facilitate the discussion of any particular element, the most significant digit or digits of any reference number refers to the Figure in which that element is first introduced. For example, element 107 is first introduced and discussed with reference to FIG. 1.

DETAILED DESCRIPTION

I. Overview

Voice control can be beneficial for a "smart" home having smart appliances and related devices, such as wireless illumination devices, home-automation devices (e.g., thermostats, door locks, etc.), and audio playback devices. In some implementations, networked microphone devices may be used to control smart home devices. A network microphone device (NMD) will typically include a microphone for receiving voice inputs. The network microphone device can forward voice inputs to a voice assistant service (VAS). A traditional VAS may be a remote service implemented by cloud servers to process voice inputs. A VAS may process a voice input to determine an intent of the voice input. Based on the response, the NMD may cause one or more smart devices to perform an action. For example, the NMD may instruct an illumination device to turn on/off based on the response to the instruction from the VAS.

A voice input detected by an NMD will typically include a wake word followed by an utterance containing a user request. The wake word is typically a predetermined word or phrase used to "wake up" and invoke the VAS for interpreting the intent of the voice input. For instance, in querying the AMAZON® VAS, a user might speak the wake word "Alexa." Other examples include "Ok, Google" for invoking the GOOGLE® VAS and "Hey, Siri" for invoking the APPLE® VAS, or "Hey, Sonos" for a VAS offered by SONOS®.

In operation, an NMD listens for a user request or command accompanying a wake word in the voice input. In some instances, the user request may include a command to control a third-party device, such as a thermostat (e.g., NEST® thermostat), an illumination device (e.g., a PHILIPS HUE® lighting device), or a media playback device (e.g., a Sonos® playback device). For example, a user might speak the wake word "Alexa" followed by the utterance "set the thermostat to 68 degrees" to set the temperature in a home using the Amazon® VAS. A user might speak the same wake word followed by the utterance "turn on the living room lights" to turn on illumination devices in a living room area of the home. The user may similarly speak a wake word followed by a request to play a particular song, an album, or a playlist of music on a playback device in the home.

In addition to voice control, some NMDs also provide voice communication capabilities, such as "intercom" or "drop in" communications, and in the future, some NMDs may reliably support Voice over Internet Protocol (VOIP) telephone capabilities, and IP-based video and voice calling features. In some embodiments, the voice communication capabilities can be initiated via voice commands and/or via controller devices configured to control the NMDs, including controlling the NMDs to initiate and effectuate voice and video communication features.

For example, an NMD may provide an "Intercom" feature (sometimes called a "Drop In" feature) that allows users to communicate with each other via multiple NMDs typically on the same Local Area Network (LAN). In one example, a first NMD is located in a basement room and a second NMD is located in a kitchen. With the "Intercom" feature, a user in the basement room can initiate an "Intercom" session between the first NMD in the basement room and the second NMD located upstairs in the kitchen by saying, for example, "Hey, Sonos, intercom to the kitchen." In response to the voice command, the first NMD in the basement room establishes a bi-directional intercom session with the second NMD in the upstairs kitchen via a wireless (e.g., WiFi) and/or wired (e.g., Ethernet) LAN in the home so that a user in the basement room and a user in the kitchen can talk with each other via the NMDs.

In another example, an NMD may provide a "Talk" feature that allows two users in the same or different locations to communicate with each other via multiple NMDs. In one example, a first user (e.g., Jack) with a first NMD is located at a first location (e.g., Jack's house) and a second user (e.g., Jill) with a second NMD is located at a second location (e.g., Jill's house). With the "Talk" feature, Jack can initiate a "Talk" session with Jill by saying, for example, "Hey, Sonos, talk to Jill." In response to the voice command, Jack's NMD at his house establishes a bi-directional IP communication session with Jill's NMD at her house so that Jack and Jill can talk to each other via their respective NMDs over one or more networks, including but not limited to Jack's LAN, the Internet, and Jill's LAN. In some embodiments, the IP communication includes one or both video and voice.

In another example, an NMD may provide a "Call" feature that allows a first user's NMD to call a second user's telephone via the Internet or the public telephone networks, and vice versa. In one example, a first user (e.g., Jack) with a first NMD is located at a first location (e.g., Jack's house) and a second user (e.g., Jill) with a mobile phone (or other device connected to a public telephone network) is located at a second location (e.g., Jill's office). With the "Call" feature, Jack can initiate a "Call" session with Jill by saying, for example, "Hey, Sonos, call Jill." In response to the voice command, Jack's NMD at his house establishes a bi-directional phone call with Jill's mobile phone at her office so that Jack and Jill can talk to each other as though Jack's NMD were another telephone. In some embodiments, the bi-directional phone call comprises one or more video and/or VoIP communication sessions.

Although initiating and receiving voice communications via NMDs may be convenient, there are times when a user may not wish to receive voice and/or video communications via his or her NMD from other NMDs, computing devices, and/or mobile phones. Therefore, in some embodiments disclosed herein, NMDs are configured with a "Do Not Disturb" (DND) feature that, when activated, causes the NMD in some circumstances to reject incoming requests for a communication session and perhaps also perform additional actions related to the request.

But while some of the advanced DND features implemented with NMDs may be similar in some respects to the types of basic DND features that have long been available on phone handsets used with private branch exchange (PBX) and similar telephony equipment, NMDs provide a vast array of additional features and functionality beyond simple phone handsets and/or PBXs, and thus, implementing DND features on an NMD presents new opportunities for advanced DND features and functions along with correspondingly new technical implementation challenges flowing therefrom. As will become apparent, the advanced DND features and functions for use with NMDs disclosed and described herein were neither desired nor even contemplated in the context of PBX systems in view of the different purposes, operating environments, and technical architectures of the two disparate classes of devices.

For example, with respect to advanced features, a user can speak voice commands to an NMD that causes the NMD to perform a multitude of advanced functions, including but not limited to, for example, adding items to a shopping list for purchase via the Internet, purchasing items via the Internet, ordering food from a food delivery service, retrieving movie times from local theaters, requesting a taxi or car service, retrieving local weather forecasts and updated sports scores, playing audio books or podcasts, playing audio content from any of a variety of Internet music providers, purchasing pay-per-view movies and sporting events for viewing on the user's home theater system, controlling smart home appliances, configuring and controlling networks of playback devices, and so on. Indeed, NMD and VAS technology is advancing rapidly and NMDs and VASes are expected to support many more advanced features in the future.

In operation, the user may not wish to be disturbed by voice or video calls while the user is having a dialog with the VAS via the NMD (e.g., while adding items to a shopping list, purchasing items, ordering food, retrieving movie times, requesting a taxi or car service, etc.). Similarly, a user may not wish to be disturbed by voice or video calls while certain playback devices (e.g., in a den or basement) are playing audio data received from a television, set-top box, or similar audio source that suggests the user is watching a movie or television show. Likewise, a user may not wish to be disturbed by voice or video calls while certain playback devices (e.g., in a dining room or kitchen) are playing certain audio content, such a dinner playlist, which suggests the user is having dinner. Further, a user may not wish to be disturbed by voice or video calls while the user's playback devices in certain zones (e.g., all playback devices on the main floor and the patio) are configured in a "party mode" where they all play the same audio content in synchrony, which suggests that the user might be entertaining guests at his or her home.

However, for many users, it may be complicated and cumbersome to repeatedly activate and deactivate a DND feature in a manual fashion on one or more NMDs in a home to avoid interruptions while performing or otherwise engaging in the above-described activities. Therefore, NMDs according to some embodiments disclosed herein are configured to (i) determine whether the DND feature should be activated, and (ii) in response to determining that the DND feature should be activated, activate the DND feature. NMDs according to some embodiments herein are also configured to additionally (i) determine whether the DND feature should be deactivated, and (ii) in response to determining that the DND feature should be deactivated, deactivate the DND feature.

For example, in some embodiments, when determining whether the DND feature should be activated (or deactivated), the NMD may consider, in any combination, one or more (or all) of: (i) the network configuration that the NMD is currently in (e.g., standalone NMD, configured in a synchrony group, an NMD paired with a playback device, and so on); (ii) changes to the NMD's network configuration (e.g., activating/deactivating a zone scene, pairing/un-pairing with a playback device, joining/leaving a synchrony group, and so on); (iii) whether the NMD is playing audio content, and if so, the type and/or source of the audio content; (iv) whether the NMD's microphones are disabled, and if so, whether the microphones were disabled via a hard-kill or a soft-kill mechanism, as described herein; and/or (v) whether one or more other NMDs' microphones are disabled, and if so, the NMD's relationship to those other NMDs having disabled microphones (e.g., paired with another NMD having a disabled microphone, grouped in a zone group with one or more other NMDs having disabled microphones, grouped in a synchrony group with one or more other NMDs having disabled microphones, bonded with one or more other NMDs having disabled microphones, and so on).

In addition to having the capability to activate/deactivate the DND feature in a wide variety of scenarios (sometimes referred to herein as actuating or toggling the DND feature), NMDs according to some embodiments disclosed herein are configured to take different actions in response to receiving incoming requests for communication sessions while the DND feature is activated. For example, in some embodiments, based at least in part on the type of communication session and/or origin of the request, an NMD determines one or more of the timing (e.g., upon receipt of the request or later) and form of any notification(s) (e.g., application alert on a user's smartphone, text message to user's smartphone, audible alert via NMD speaker, on-screen message displayed on screen associated with the NMD) that the NMD may generate or otherwise send to a user associated with the NMD to notify the user that the NMD received (or perhaps is receiving) a request for a communication session (and perhaps the origin of the request). And in some embodiments, based at least in part on the type of communication session, origin of the request, and/or the type of function the NMD may be engaged in when it receives the incoming request, the NMD may additionally or alternatively (i) direct the incoming request to another NMD, (ii) direct the request to a user's mobile phone, (iii) direct the incoming request to a voice mailbox or a voice-to-text application, (iv) notify the originating device that sent the request that the DND feature is activated, and if the NMD is playing audio content, perhaps additionally inform the originating device of the audio content that the NMD is currently playing.

In some embodiments, if the NMD receives a request for a communication session while the NMD is playing audio content (in synchrony or otherwise) in a group with one or more other playback devices, and if the DND feature is activated, the NMD may, perhaps depending at least in part on the type of communication and the origin of the communication request, cause the other playback devices in the group to duck (i.e., reduce) their audio playback volume level while the NMD temporarily breaks away from the group to handle the requested voice communication. While the NMD has temporarily broken away from the group, the other playback devices in the group continue to play back the audio content at the ducked volume level, and the NMD implements the voice communication session rather than playing the audio content. Then, after the voice communication session has ended, the NMD rejoins the group of other playback devices and begins playing back audio content again with the other playback devices in the group. When rejoining the group, the NMD begins playing the audio content that the other playback devices in the group are playing at the time that the NMD rejoins the group, and after the NMD has rejoined the group, the NMD and the other playback devices in the group increase their volume levels to their previous levels prior to the NMD receiving the request for the communication session.

Because NMDs according to some embodiments have the capability to activate and deactivate the DND feature, NMDs according to some embodiments are additionally configured to inform a user of the DND feature status (i.e., active (or activated) vs. not active (or deactivated)). For example, in some embodiments, an NMD may generate an audible notification that indicates the DND feature has been activated (e.g., playing a first tone when DND is activated, and playing a second tone when DND is deactivated). In some embodiments, the NMD informs a controller application running on a controller device (e.g., a smartphone or other computing device) of the current state of the DND feature (i.e., activated vs. deactivated) for the NMD. Some NMDs can be controlled by multiple controller applications from multiple manufacturers and/or software vendors; perhaps even multiple controller applications running on the same controller device (e.g. a smartphone or other computing device). For example, in some embodiments, an NMD from SONOS® may be controlled by both a first controller application from SONOS® and a second controller application from AMAZON®. In some embodiments, the first and second controller applications run on the same controller device, e.g., the user's smartphone or other computing device.

While some embodiments described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be implemented. The media playback system 100 as shown is associated with an example home environment having several rooms and spaces, such as for example, an office, a dining room, and a living room. Within these rooms and spaces, the media playback system 100 includes playback devices 102 (identified individually as playback devices 102a-102m), network microphone devices 103 (identified individually as "NMD(s)" 103a-103g), and controller devices 104a and 104b (collectively "controller devices 104"). The home environment may include other network devices, such as one or more smart illumination devices 108 and a smart thermostat 110.

The various playback, network microphone, and controller devices 102-104 and/or other network devices of the media playback system 100 may be coupled to one another via point-to-point connections and/or over other connections, which may be wired and/or wireless, via a LAN including a network router 106. For example, the playback device 102j (designated as "Left") may have a point-to-point connection with the playback device 102a (designated as "Right"). In one embodiment, the Left playback device 102j may communicate over the point-to-point connection with the Right playback device 102a. In a related embodiment, the Left playback device 102j may communicate with other network devices via the point-to-point connection and/or other connections via the LAN.

The network router 106 may be coupled to one or more remote computing device(s) 105 via a wide area network (WAN) 107. In some embodiments, the remote computing device(s) may be cloud servers. The remote computing device(s) 105 may be configured to interact with the media playback system 100 in various ways. For example, the remote computing device(s) may be configured to facilitate streaming and controlling playback of media content, such as audio, in the home environment. In one aspect of the technology described in greater detail below, the remote computing device(s) 105 are configured to provide a first VAS 160 for the media playback system 100.

In some embodiments, one or more of the playback devices 102 may include an on-board (e.g., integrated) network microphone device. For example, the playback devices 102a-e include corresponding NMDs 103a-e, respectively. Playback devices that include network microphone devices may be referred to herein interchangeably as a playback device or a network microphone device unless indicated otherwise in the description.

In some embodiments, one or more of the NMDs 103 may be a stand-alone device. For example, the NMDs 103f and 103g may be stand-alone network microphone devices. A stand-alone network microphone device may omit components typically included in a playback device, such as a speaker or related electronics. In such cases, a stand-alone network microphone device may not produce audio output or may produce limited audio output (e.g., relatively low-quality audio output compared to a playback device).

In use, a network microphone device may receive and process voice inputs from a user in its vicinity. For example, a network microphone device may capture a voice input upon detection of the user speaking the input. In the illustrated example, the NMD 103a of the playback device 102a in the Living Room may capture the voice input of a user in its vicinity. In some instances, other network microphone devices (e.g., the NMDs 103b and 103f) in the vicinity of the voice input source (e.g., the user) may also detect the voice input. In such instances, network microphone devices may arbitrate between one another to determine which device(s) should capture and/or process the detected voice input. Examples for selecting and arbitrating between network microphone devices may be found, for example, in U.S. application Ser. No. 15/438,749 filed Feb. 21, 2017, and titled "Voice Control of a Media Playback System," which is incorporated herein by reference in its entirety.

In certain embodiments, a network microphone device may be assigned to a playback device that may not include a network microphone device. For example, the NMD 103f may be assigned to the playback devices 102i and/or 102l in its vicinity. In a related example, a network microphone device may output audio through a playback device to which it is assigned. Additional details regarding associating network microphone devices and playback devices as designated or default devices may be found, for example, in previously referenced U.S. patent application Ser. No. 15/438,749.

Further aspects relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in other home environment configurations comprising more or fewer of any of the playback, network microphone, and/or controller devices 102-104. Additionally, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback and Network Microphone Devices

By way of illustration, SONOS, Inc. presently offers (or has offered) for sale certain playback devices including a "PLAY: 1," "SONOS ONE" "PLAY: 3," "PLAY: 5," "PLAYBAR," "PLAYBASE," "BEAM," "CONNECT: AMP," "CONNECT," and "SUB." Any other past, present, and/or future playback devices may additionally or alternatively be used to implement the playback devices of example embodiments disclosed herein. Additionally, it is understood that a playback device is not limited to the examples shown and described herein or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

Figure 2A:
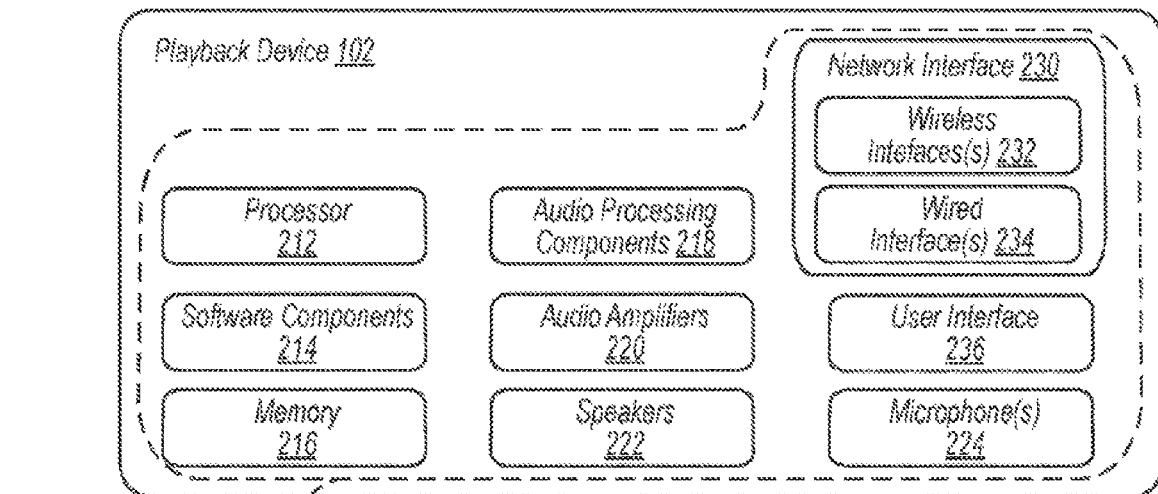
FIG. 2A is a functional block diagram of an example playback device.

FIG. 2A is a functional block diagram illustrating certain aspects of a selected one of the playback devices 102 shown in FIG. 1. As shown, such a playback device may include a processor 212, software components 214, memory 216, audio processing components 218, audio amplifier(s) 220, speaker(s) 222, and a network interface 230 including wireless interface(s) 232 and wired interface(s) 234. In some embodiments, a playback device may not include the speaker(s) 222, but rather a speaker interface for connecting the playback device to external speakers. In certain embodiments, the playback device may include neither the speaker(s) 222 nor the audio amplifier(s) 222, but rather an audio interface for connecting a playback device to an external audio amplifier or audio-visual receiver.

A playback device may further include a user interface 236. The user interface 236 may facilitate user interactions independent of or in conjunction with one or more of the controller devices 104. In various embodiments, the user interface 236 includes one or more of physical buttons and/or graphical interfaces provided on touch sensitive screen(s) and/or surface(s), among other possibilities, for a user to directly provide input. The user interface 236 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may include or otherwise involve a playback device synchronizing playback of audio content with one or more other playback devices. During synchronous playback, a listener may not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G & 5G mobile communication standards, and so on). The wired interface(s) 234 may provide network interface functions for a playback device to communicate over a wired connection with other devices in accordance with a communication protocol (e.g., IEEE 802.3). While the network interface 230 shown in FIG. 2A includes both wireless interface(s) 232 and wired interface(s) 234, the network interface 230 may in some embodiments include only wireless interface(s) or only wired interface(s).

As discussed above, a playback device may include a network microphone device, such as one of the NMDs 103 shown in FIG. 1. A network microphone device may share some or all the components of a playback device, such as the processor 212, the memory 216, the microphone(s) 224, etc. In other examples, a network microphone device includes components that are dedicated exclusively to operational aspects of the network microphone device. For example, a network microphone device may include far-field microphones and/or voice processing components, which in some instances a playback device may not include. But in some embodiments, a playback device may contain the same or similar far-field microphones and/or voice processing components as a network microphone device, thereby enabling the playback device to function as a networked microphone device. In another example, a network microphone device may include a touch-sensitive button for enabling/disabling a microphone.

Figure 2B:
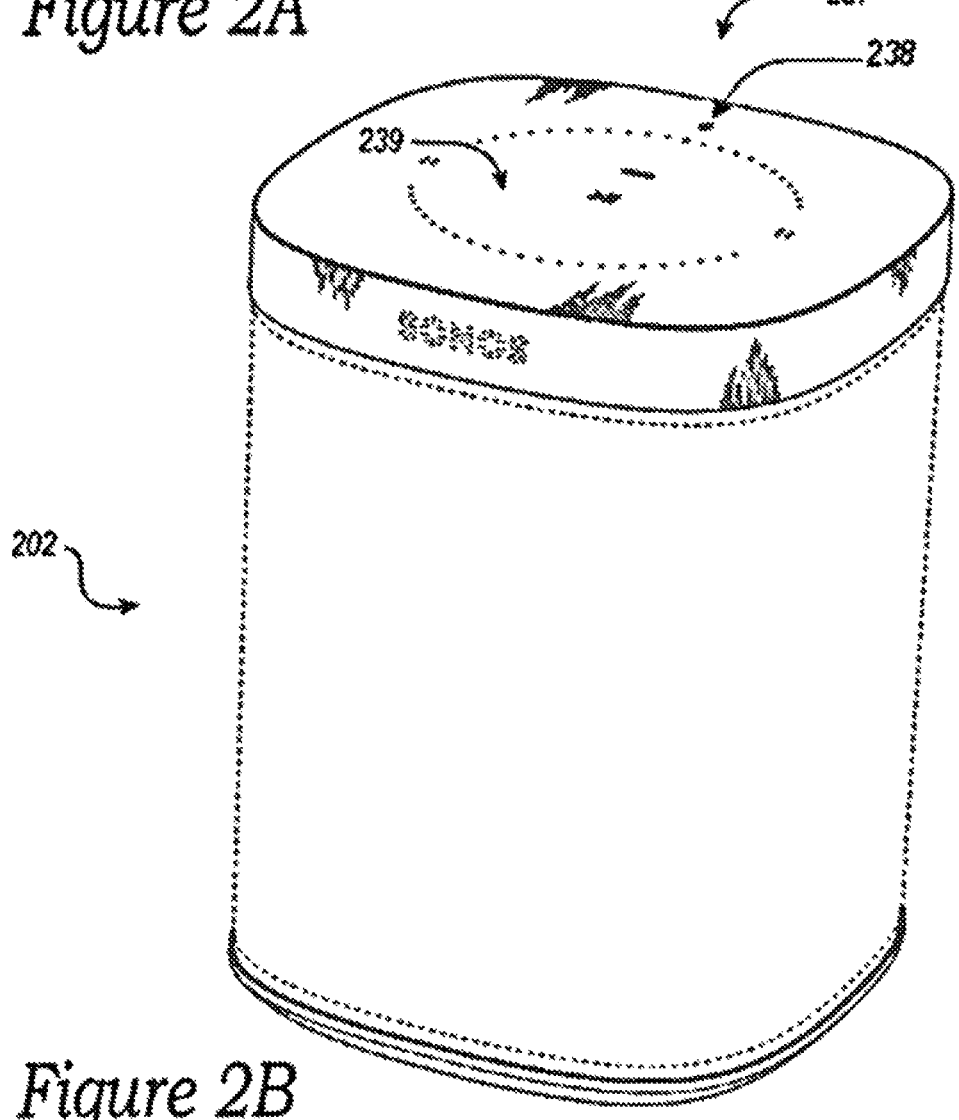
FIG. 2B is a isometric diagram of an example playback device that includes a network microphone device.

FIG. 2B is an isometric diagram showing an example playback device 202 incorporating a network microphone device (NMD). The playback device 202 has a control area 237 at the top of the device comprising a switch 238 to turn the microphones "on" and/or "off" via a manual control input, e.g., the user touches the switch 238 to toggle the microphones on/off. The control area 237 is adjacent to another area 239 at the top of the playback device 202 for controlling playback. In some embodiments, switch 238 functions as a hard-kill switch. A hard-kill switch differs from a soft-kill switch by physically disconnecting from power or otherwise mechanically deactivating the microphone(s) of the NMD. A hard-kill switch in this context cannot be functionally toggled or controlled in software remotely. Such a hard-kill feature assures the user that the microphones cannot be activated inadvertently by a user or others, or surreptitiously or otherwise by others, because the hard-kill switch completely disconnects power from the microphones of the NMD.

In some embodiments, an NMD is configured to include a soft-kill switch (not shown) and/or a controller application, such as a controller application running on a controller device, can include a soft-kill switch activation function.

a(i). Switch 238 Functions as a Hard-Kill Switch

When the switch 238 functions as a hard-kill switch, the playback device 202 supplies power to the microphones and voice-processing components when switch 238 is in the "on" state. While switch 238 is in the "on" state and the playback device 202 is supplying power to the microphones and voice-processing components, the playback device 202 can enable and disable the microphones in response to voice commands received via the microphone and commands received from a controller application running on a controller device (e.g., the Sonos application running on a user's smartphone or other computing device).

When switch 238 is in the "on" state and playback device 202 has enabled the microphones, the microphones listen for and record wake words and voice commands for processing by the playback device 202 and/or VAS.

In some embodiments, when switch 238 is in the "on" state and the playback device 202 has disabled the microphones, the microphones do not listen for or record wake words or voice commands for processing even though the switch 238 is in the "on" state and the playback device 202 is supplying power to the microphones and voice-processing components.

Alternatively, in some embodiments, when switch 238 is in the "on" state and the playback device 202 has disabled the microphones, the microphones may listen for a wake word and a specific microphone activation command (e.g., "Hey Sonos, activate the microphones"), but the playback device 202 will only process (i.e., process locally or send to the VAS for processing) the specific microphone activation command, and it will not process (i.e., locally or via the VAS) any other commands. For example, if a user speaks a command other than the specific microphone activation command after the wake word, e.g., "Hey Sonos, turn on the bedroom lights," the playback device 202 will not process the "turn on the bedroom lights" command. In some embodiments, in response to detecting the wake word but not detecting the specific microphone activation command, the playback device 202 plays a voice response notifying the user that the microphones are disabled, and perhaps also asks the user if he or she would like the playback device 202 to activate the microphones. For example, the playback device 202 may respond, "I'm sorry, the microphone is disabled. Would you like to enable it?" And if the user replies, "Yes," then playback device 202 reactivates the microphones so that the microphones can resume listening for and recording wake words and voice commands for processing by the playback device 202 and/or VAS.

In some embodiments, when the switch 238 is in the "off" state, the playback device 202 cuts off power to the microphones and/or voice-processing components. While switch 238 is in the "off" state and the playback device 202 has cut power to the microphones and/or voice-processing components, the microphones cannot listen for any sounds, including wake words. Importantly, in such embodiments, while switch 238 is in the "off" state, the playback device 202 cannot enable or disable the microphones in response to voice commands received via the microphone or commands received from a controller application running on a controller device.

a(ii). Switch 238 Functions as a Soft-Kill Switch

In embodiments where switch 238 functions as a soft-kill switch, the playback device 202 supplies power to the microphones and voice-processing components when the switch 238 is in the "on" state and when the switch 238 is in the "off" state. Thus, in embodiments where switch 238 functions as a soft-kill switch, toggling switch 238 between the on/off states functions in a manner similar to the playback device 202 activating/deactivating the microphones when switch 238 functions as a hard-kill switch and switch 238 is in the "on" state, as described above.

In some embodiments, when switch 238 is in the "on" state, the microphones are enabled, and the microphones are listening for and recording wake words and voice commands for processing by the playback device 202 and/or VAS. In some embodiments, even though the switch 238 is in the "on" state, the playback device 202 can still disable the microphones in response to voice commands received via the microphone and commands received from a controller application running on a controller device. In some embodiments, disabling the microphones includes the playback device 202 additionally toggling switch 238 to the "off" state.

In some embodiments, when switch 238 is in the "off" state, the microphones do not listen for or record wake words or voice commands for processing even though the playback device 202 is still providing power to the microphones and voice-processing components. In some embodiments, even though the switch 238 is in the "off" state, the playback device 202 can still enable the microphones in response to voice commands received via the microphone and commands received from a controller application running on a controller device. In some embodiments, enabling the microphones includes the playback device 202 additionally toggling switch 238 to the "on" state.

For example, while the soft-kill switch is in the "off" state, the microphones may listen for a wake word and a specific microphone activation command (e.g., "Hey Sonos, activate the microphones"), but the playback device 202 will only process (i.e., process locally or send to the VAS for processing) the specific microphone activation command, and it will not process (i.e., locally or via the VAS) any other commands. For example, if a user speaks a command other than the specific microphone activation command after the wake word, e.g., "Hey Sonos, turn on the bedroom lights," the playback device 202 will not process the "turn on the bedroom lights" command because the soft-kill switch is in the "off" state. In some embodiments, in response to detecting the wake word but not detecting the specific microphone activation command, the playback device 202 plays a voice response notifying the user that the microphones are disabled, and perhaps also asks the user if he or she would like the playback device 202 to activate the microphones. For example, the playback device 202 may respond, "I'm sorry, the microphone is disabled. Would you like to enable it?" And if the user replies, "Yes," then playback device 202 reactivates the microphones so that the microphones can resume listening for and recording wake words and voice commands for processing by the playback device 202 and/or VAS.

b. Example Playback Device Configurations

Figure 3A:
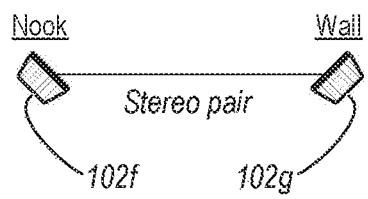
FIGS. 3A, 3B, 3C, 3D, and 3E are diagrams showing example zones and zone groups in accordance with aspects of the disclosure.
Figure 3B:
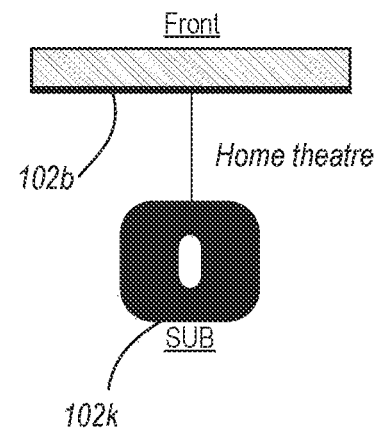
Figure 3C:
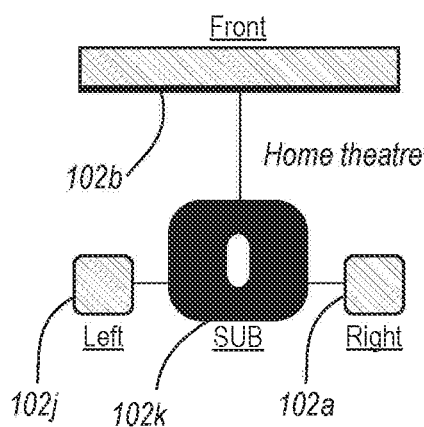
Figure 3D:
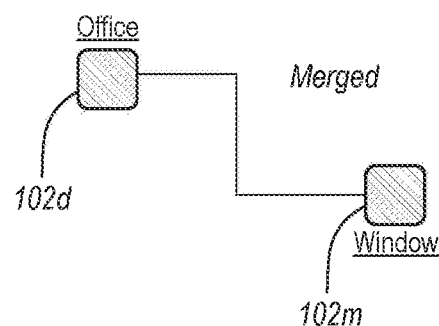
Figure 3E:
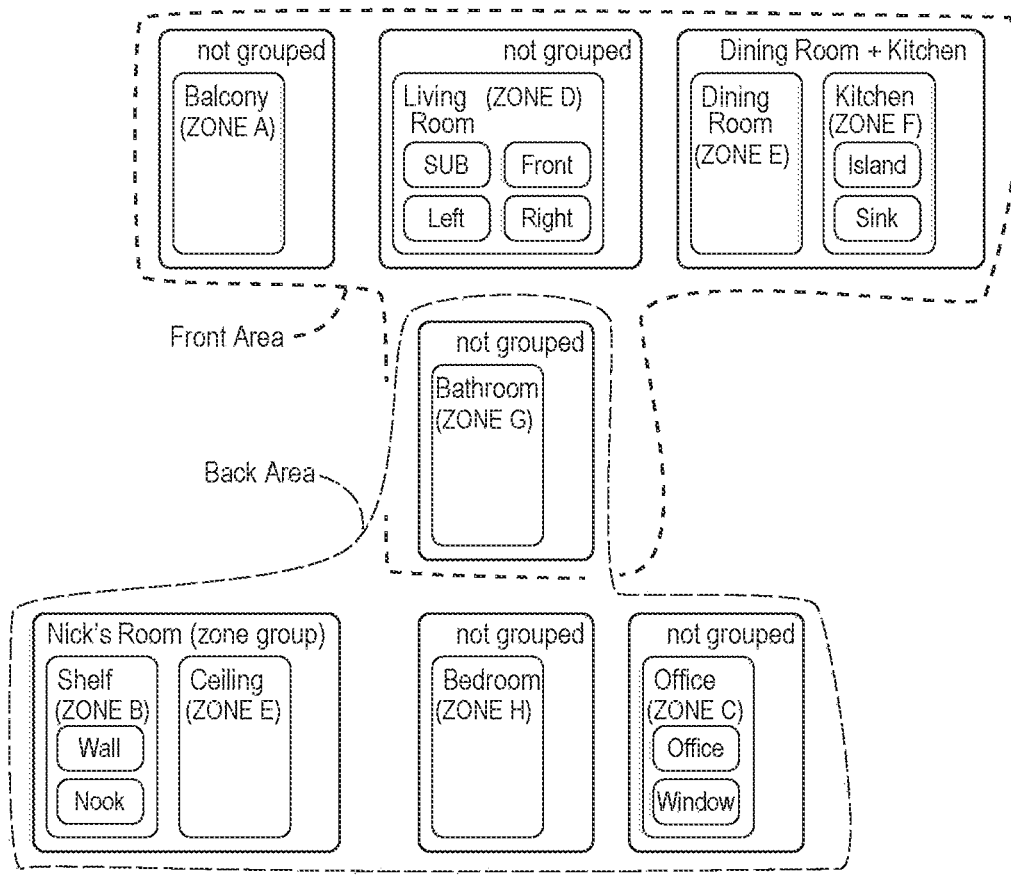

FIGS. 3A-3E show example configurations of playback devices in zones and zone groups. Referring first to FIG. 3E, in one example, a single playback device may belong to a zone. For example, the playback device 102c in the Balcony may belong to Zone A. In some implementations described below, multiple playback devices may be "bonded" to form a "bonded pair" which together form a single zone. For example, the playback device 102f named Nook in FIG. 1 may be bonded to the playback device 102g named Wall to form Zone B. Bonded playback devices may have different playback responsibilities (e.g., channel responsibilities). In another implementation described below, multiple playback devices may be merged to form a single zone. For example, the playback device 102d named Office may be merged with the playback device 102m named Window to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

Each zone in the media playback system 100 may be provided for control as a single user interface (UI) entity. For example, Zone A may be provided as a single entity named Balcony. Zone C may be provided as a single entity named Office. Zone B may be provided as a single entity named Shelf.

In various embodiments, a zone may take on the name of one of the playback device(s) belonging to the zone. For example, Zone C may take on the name of the Office device 102d (as shown). In another example, Zone C may take on the name of the Window device 102m. In a further example, Zone C may take on a name that is some combination of the Office device 102d and Window device 102 m. The name that is chosen may be selected by user. In some embodiments, a zone may be given a name that is different than the device(s) belonging to the zone. For example, Zone B is named Shelf but none of the devices in Zone B have this name.

Playback devices that are bonded may have different playback responsibilities, such as responsibilities for certain audio channels. For example, as shown in FIG. 3A, the Nook and Wall devices 102f and 102g may be bonded so as to produce or enhance a stereo effect of audio content. In this example, the Nook playback device 102f may be configured to play a left channel audio component, while the Wall playback device 102g may be configured to play a right channel audio component. In some implementations, such stereo bonding may be referred to as "pairing."

Additionally, bonded playback devices may have additional and/or different respective speaker drivers. As shown in FIG. 3B, the playback device 102b named Front may be bonded with the playback device 102k named SUB. The Front device 102b may render a range of mid to high frequencies and the SUB device 102k may render low frequencies as, e.g., a subwoofer. When un-bonded, the Front device 102b may render a full range of frequencies. As another example, FIG. 3C shows the Front and SUB devices 102b and 102k further bonded with Right and Left playback devices 102a and 102k, respectively. In some implementations, the Right and Left devices 102a and 102k may form surround or "satellite" channels of a home theatre system. The bonded playback devices 102a, 102b, 102j, and 102k may form a single Zone D (FIG. 3E).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback device 102d and 102m in the Office have the single UI entity of Zone C. In one embodiment, the playback devices 102d and 102m may each output the full range of audio content each respective playback device 102d and 102m are capable of, in synchrony.

In some embodiments, a stand-alone network microphone device may be in a zone by itself. For example, the NMD 103g in FIG. 1 named Ceiling may be Zone E. A network microphone device may also be bonded or merged with another device so as to form a zone. For example, the NMD device 103f named Island may be bonded with the playback device 102i Kitchen, which together form Zone G, which is also named Kitchen. Additional details regarding associating network microphone devices and playback devices as designated or default devices may be found, for example, in previously referenced U.S. patent application Ser. No. 15/438,749. In some embodiments, a stand-alone network microphone device may not be associated with a zone.

Zones of individual, bonded, and/or merged devices may be grouped to form a zone group. For example, referring to FIG. 3E, Zone A may be grouped with Zone B to form a zone group that includes the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group, such as Dining Room+Kitchen, as shown in FIG. 3E. In some embodiments, a zone group may be given a unique name selected by a user, such as Nick's Room, as also shown in FIG. 3E.

Referring again to FIG. 2A, certain data may be stored in the memory 216 as one or more state variables that are periodically updated and used to describe the state of a playback zone, the playback device(s), and/or a zone group associated therewith. The memory 216 may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1, identifiers associated with the Balcony may indicate that the Balcony is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the media playback system 100 may store and use variables or identifiers representing other associations of zones and zone groups, such as identifiers associated with Areas, as shown in FIG. 3. An area may involve a cluster of zone groups and/or zones not within a zone group. For instance, FIG. 3E shows a first area named Front Area and a second area named Back Area. The Front Area includes zones and zone groups of the Balcony, Living Room, Dining Room, Kitchen, and Bathroom. The Back Area includes zones and zone groups of the Bathroom, Nick's Room, the Bedroom, and the Office. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682, 506 filed Aug. 21, 2017 and titled "Room Association Based on Name," and U.S. Pat. No. 8,483,853 filed Sep. 11, 2007, and titled "Controlling and manipulating groupings in a multi-zone media system." U.S. application Ser. No. 15/682, 506 and U.S. Pat. No. 8,483,853 are both incorporated herein by reference in their entirety. In some embodiments, the media playback system 100 may not implement Areas, in which case the system may not store variables associated with Areas.

The memory 216 may be further configured to store other data. Such data may pertain to audio sources accessible by a playback device or a playback queue that the playback device (or some other playback device(s)) may be associated with. In embodiments described below, the memory 216 is configured to store a set of command data for selecting a particular VAS, such as the first VAS 160, when processing voice inputs.

During operation, one or more playback zones in the environment of FIG. 1 may each be playing different audio content. For instance, the user may be grilling in the Balcony zone and listening to hip hop music being played by the playback device 102c while another user may be preparing food in the Kitchen zone and listening to classical music being played by the playback device 102i. In another example, a playback zone may play the same audio content in synchrony with another playback zone. For instance, the user may be in the Office zone where the playback device 102d is playing the same hip-hop music that is being playing by playback device 102c in the Balcony zone. In such a case, playback devices 102c and 102d may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified. As such, the media playback system 100 may support numerous configurations. For example, if a user physically moves one or more playback devices to or from a zone, the media playback system 100 may be reconfigured to accommodate the change(s). For instance, if the user physically moves the playback device 102c from the Balcony zone to the Office zone, the Office zone may now include both the playback devices 102c and 102d. In some cases, the user may pair or group the moved playback device 102c with the Office zone and/or rename the players in the Office zone using, e.g., one of the controller devices 104 and/or voice input. As another example, if one or more playback devices 102 are moved to a particular area in the home environment that is not already a playback zone, the moved playback device(s) may be renamed or associated with a playback zone for the particular area.

Further, different playback zones of the media playback system 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices 102 in the Living Room zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Living Room zone in such a manner may allow one user to listen to music in the listening zone in one area of the living room space, and another user to watch the television in another area of the living room space. In a related example, a user may implement either of the NMD 103a or 103b to control the Living Room zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the media playback system 100.

c. Example Controller Devices

Figure 4A:
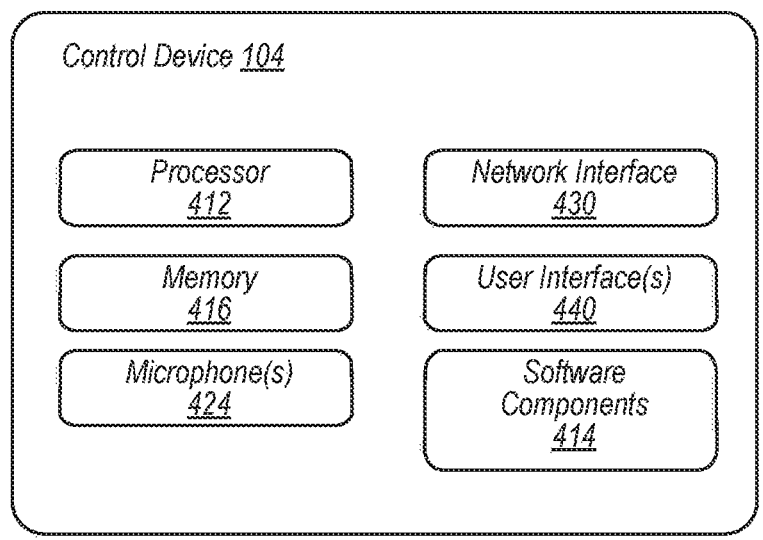
FIG. 4A is a functional block diagram of an example controller device in accordance with aspects of the disclosure.

FIG. 4A is a functional block diagram illustrating certain aspects of a selected one of the controller devices 104 of the media playback system 100 of FIG. 1. Such controller devices may also be referred to as a controller. The controller device shown in FIG. 4A may include components that are generally similar to certain components of the network devices described above, such as a processor 412, memory 416, microphone(s) 424, and a network interface 430. In one example, a controller device may be a dedicated controller for the media playback system 100. In another example, a controller device may be a network device on which media playback system controller application software may be installed, such as for example, an iPhone™, iPad™ or any other smart phone, tablet or network device (e.g., a networked computer such as a PC or Mac™).

The memory 416 of a controller device may be configured to store controller application software and other data associated with the media playback system 100 and a user of the system 100. The memory 416 may be loaded with one or more software components 414 executable by the processor 412 to achieve certain functions, such as facilitating user access, control, and configuration of the media playback system 100. A controller device communicates with other network devices over the network interface 430, such as a wireless interface, as described above.

In one example, data and information (e.g., such as a state variable) may be communicated between a controller device and other devices via the network interface 430. For instance, playback zone and zone group configurations in the media playback system 100 may be received by a controller device from a playback device, a network microphone device, or another network device, or transmitted by the controller device to another playback device or network device via the network interface 406. In some cases, the other network device may be another controller device.

Playback device control commands such as volume control and audio playback control may also be communicated from a controller device to a playback device via the network interface 430. As suggested above, changes to configurations of the media playback system 100 may also be performed by a user using the controller device. The configuration changes may include adding/removing one or more playback devices to/from a zone, adding/removing one or more zones to/from a zone group, forming a bonded or merged player, separating one or more playback devices from a bonded or merged player, among others.

Figures 4B, 4C:
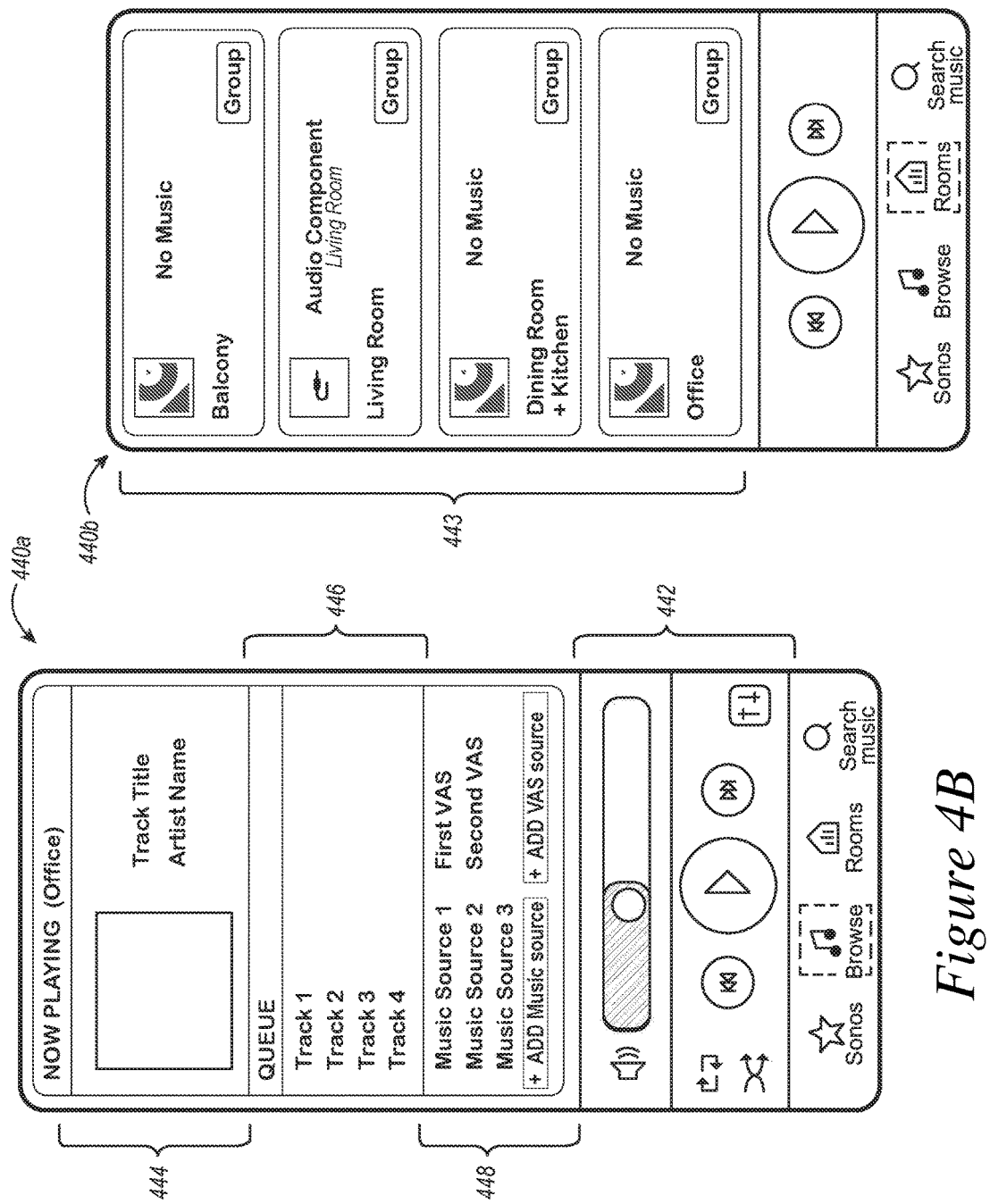
FIGS. 4B and 4C are controller interfaces in accordance with aspects of the disclosure.

The user interface(s) 440 of a controller device may be configured to facilitate user access and control of the media playback system 100, by providing controller interface(s) such as the controller interfaces 440a and 440b shown in FIGS. 4B and 4C, respectively, which may be referred to collectively as the controller interface 440. Referring to FIGS. 4B and 4C together, the controller interface 440 includes a playback control region 442, a playback zone region 443, a playback status region 444, a playback queue region 446, and a sources region 448. The user interface 400 as shown is just one example of a user interface that may be provided on a network device such as the controller device shown in FIG. 3 and accessed by users to control a media playback system such as the media playback system 100. Other user interfaces of varying formats, styles, and interactive sequences may alternatively be implemented on one or more network devices to provide comparable control access to a media playback system.

The playback control region 442 (FIG. 4B) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 442 may also include selectable icons to modify equalization settings, and playback volume, among other possibilities.

The playback zone region 443 (FIG. 4C) may include representations of playback zones within the media playback system 100. The playback zones regions may also include representation of zone groups, such as the Dining Room+ Kitchen zone group, as shown. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on the user interface, such as within the playback zone region 443 and/or the playback status region 444. The graphical representations may include track title, artist name, album name, album year, track length, and other relevant information that may be useful for the user to know when controlling the media playback system via the user interface 440.

The playback queue region 446 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 4B and 4C, the graphical representations of audio content in the playback queue region 446 (FIG. 4C) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and selectable voice assistants associated with a corresponding VAS. The VASes may be selectively assigned. In some examples, multiple VASes, such as AMAZON's ALEXA® and another voice service, may be invokable by the same network microphone device. In some embodiments, a user may assign a VAS exclusively to one or more network microphone devices. For example, a user may assign the first VAS 160 to one or both of the NMDs 102a and 102b in the Living Room shown in FIG. 1, and a second VAS to the NMD 103f in the Kitchen. Other examples are possible, too.

d. Example Audio Content Sources

The audio sources in the sources region 448 may be audio content sources from which audio content may be retrieved and played by the selected playback zone or zone group. One or more playback devices in a zone or zone group may be configured to retrieve playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a controller device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Network Microphone Devices

Figure 5A:
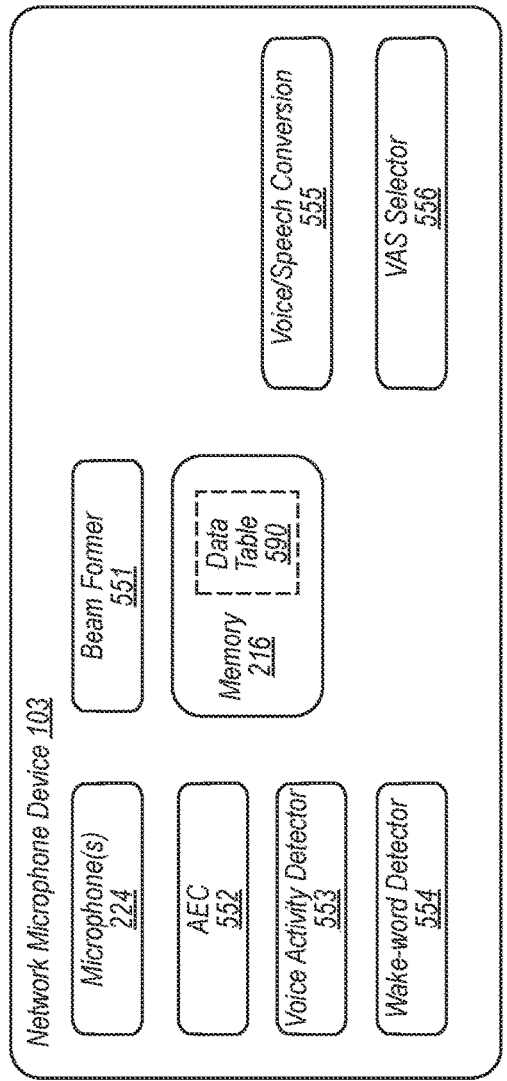
FIG. 5A is a functional block diagram of an example network microphone device in accordance with aspects of the disclosure.

FIG. 5A is a functional block diagram showing additional features of one or more of the NMDs 103 in accordance with aspects of the disclosure. The network microphone device shown in FIG. 5A may include components that are generally similar to certain components of network microphone devices described above, such as the processor 212 (FIG. 1), network interface 230 (FIG. 2A), microphone(s) 224, and the memory 216. Although not shown for purposes of clarity, a network microphone device may include other components, such as speakers, amplifiers, signal processors, as discussed above.

The microphone(s) 224 may be a plurality of microphones arranged to detect sound in the environment of the network microphone device. In one example, the microphone(s) 224 may be arranged to detect audio from one or more directions relative to the network microphone device. The microphone(s) 224 may be sensitive to a portion of a frequency range. In one example, a first subset of the microphone(s) 224 may be sensitive to a first frequency range, while a second subset of the microphone(s) 224 may be sensitive to a second frequency range. The microphone(s) 224 may further be arranged to capture location information of an audio source (e.g., voice, audible sound) and/or to assist in filtering background noise. Notably, in some embodiments the microphone(s) 224 may have a single microphone rather than a plurality of microphones.

A network microphone device may further include beam former components 551, acoustic echo cancellation (AEC) components 552, voice activity detector components 553, wake word detector components 554, speech/text conversion components 555 (e.g., voice-to-text and text-to-voice), and VAS selector components 556. In various embodiments, one or more of the components 551-556 may be a subcomponent of the processor 512.

The beamforming and AEC components 551 and 552 are configured to detect an audio signal and determine aspects of voice input within the detect audio, such as the direction, amplitude, frequency spectrum, etc. For example, the beamforming and AEC components 551 and 552 may be used in a process to determine an approximate distance between a network microphone device and a user speaking to the network microphone device. In another example, a network microphone device may detective a relative proximity of a user to another network microphone device in a media playback system.

The voice activity detector activity components 553 are configured to work closely with the beamforming and AEC components 551 and 552 to capture sound from directions where voice activity is detected. Potential speech directions can be identified by monitoring metrics which distinguish speech from other sounds. Such metrics can include, for example, energy within the speech band relative to background noise and entropy within the speech band, which is measure of spectral structure. Speech typically has a lower entropy than most common background noise.

The wake-word detector components 554 are configured to monitor and analyze received audio to determine if any wake words are present in the audio. The wake-word detector components 554 may analyze the received audio using a wake word detection algorithm. If the wake-word detector 554 detects a wake word, a network microphone device may process voice input contained in the received audio. Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wakewords.

In some embodiments, the wake-word detector 554 runs multiple wake word detection algorithms on the received audio simultaneously (or substantially simultaneously). As noted above, different voice services (e.g. AMAZON's ALEXA®, APPLE's SIRI®, or MICROSOFT's CORTANA®) each use a different wake word for invoking their respective voice service. To support multiple services, the wake word detector 554 may run the received audio through the wake word detection algorithm for each supported voice service in parallel.

The VAS selector components 556 are configured to detect for commands spoken by the user within a voice input. The speech/text conversion components 555 may facilitate processing by converting speech in the voice input to text. In some embodiments, a network microphone device may include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional VASes, which typically sample from a broad base of users and diverse requests that are not targeted to media playback systems The VAS selector components 556 are also configured to determine if certain command criteria are met for particular command(s) detected in a voice input. Command criteria for a given command in a voice input may be based, for example, on the inclusion of certain keywords within the voice input. A keyword may be, for example, a word in the voice input identifying a particular device or group in the media playback system 100. As used herein, the term "keyword" may refer to a single word (e.g., "Bedroom") or a group of words (e.g., "the Living Room").

In addition or alternatively, command criteria for given command(s) may involve detection of one or more control state and/or zone state variables in conjunction with detecting the given command(s). Control state variables may include, for example, indicators identifying a level of volume, a queue associated with one or more device(s), and playback state, such as whether devices are playing a queue, paused, etc. Zone state variables may include, for example, indicators identifying which, if any, zone players are grouped. The VAS selector components 556 may store in the memory 216 a set of command information, such as in a data table 590, that contains a listing of commands and associated command criteria, which are described in greater detail below.

In some embodiments, one or more of the components 551-556 described above can operate in conjunction with the microphone(s) 224 to detect and store a user's voice profile, which may be associated with a user account of the media playback system 100. In some embodiments, voice profiles may be stored as and/or compared to variables stored in the set of command information 590, as described below. The voice profile may include aspects of the tone or frequency of user's voice and/or other unique aspects of the user such as those described in previously referenced U.S. patent application Ser. No. 15/438,749.

In some embodiments, one or more of the components 551-556 described above can operate in conjunction with the microphone array 524 to determine the location of a user in the home environment and/or relative to a location of one or more of the NMDs 103. The location or proximity of a user may be detected and compared to a variable stored in the command information 590, as described below. Techniques for determining the location or proximity of a user may include or more techniques disclosed in previously referenced U.S. patent application Ser. No. 15/438,749, U.S. Pat. No. 9,084,058 filed Dec. 29, 2011, and titled "Sound Field Calibration Using Listener Localization," and U.S. Pat. No. 8,965,033 filed Aug. 31, 2012, and titled "Acoustic Optimization." U.S. patent application Ser. No. 15/438,749, U.S. Pat. Nos. 9,084,058, and 8,965,033 are incorporated herein by reference in their entirety.

Figure 5B:
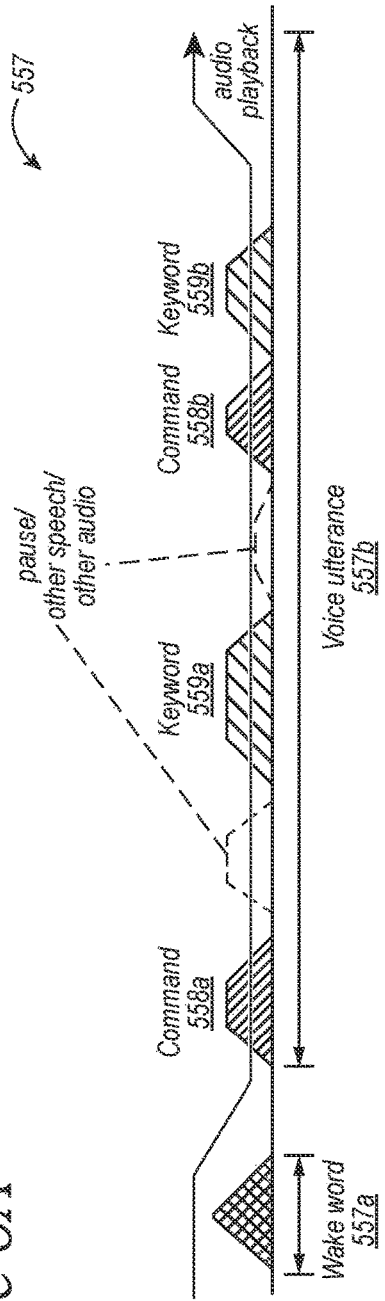
FIG. 5B is a diagram of an example voice input in accordance with aspects of the disclosure.

FIG. 5B is a diagram of an example voice input in accordance with aspects of the disclosure. The voice input may be captured by a network microphone device, such as by one or more of the NMDs 103 shown in FIG. 1. The voice input may include a wake word portion 557a and a voice utterance portion 557b (collectively "voice input 557"). In some embodiments, the wake word 557a can be a known wake word, such as "Alexa," which is associated with AMAZON's ALEXA®). In other embodiments, the voice input 557 may not include a wake word.

In some embodiments, a network microphone device may output an audible and/or visible response upon detection of the wake word portion 557a. Additionally or alternatively, a network microphone device may output an audible and/or visible response after processing a voice input and/or a series of voice inputs (e.g., in the case of a multi-turn request).

The voice utterance portion 557b may include, for example, one or more spoken commands 558 (identified individually as a first command 558a and a second command 558b) and one or more spoken keywords 559 (identified individually as a first keyword 559a and a second keyword 559b). In one example, the first command 557a can be a command to play music, such as a specific song, album, playlist, etc. In this example, the keywords 559 may be one or more words identifying one or more zones in which the music is to be played, such as the Living Room and the Dining Room shown in FIG. 1. In some examples, the voice utterance portion 557b can include other information, such as detected pauses (e.g., periods of non-speech) between words spoken by a user, as shown in FIG. 5B. The pauses may demarcate the locations of separate commands, keywords, or other information spoke by the user within the voice utterance portion 557b.

In some embodiments, the media playback system 100 is configured to temporarily reduce the volume of audio content that it is playing while detecting the wake word portion 557a. The media playback system 100 may restore the volume after processing the voice input 557, as shown in FIG. 5B. Such a process can be referred to as ducking, examples of which are disclosed in previously referenced U.S. patent application Ser. No. 15/438,749.

f. Example Network and Remote Computing Systems

Figure 6:
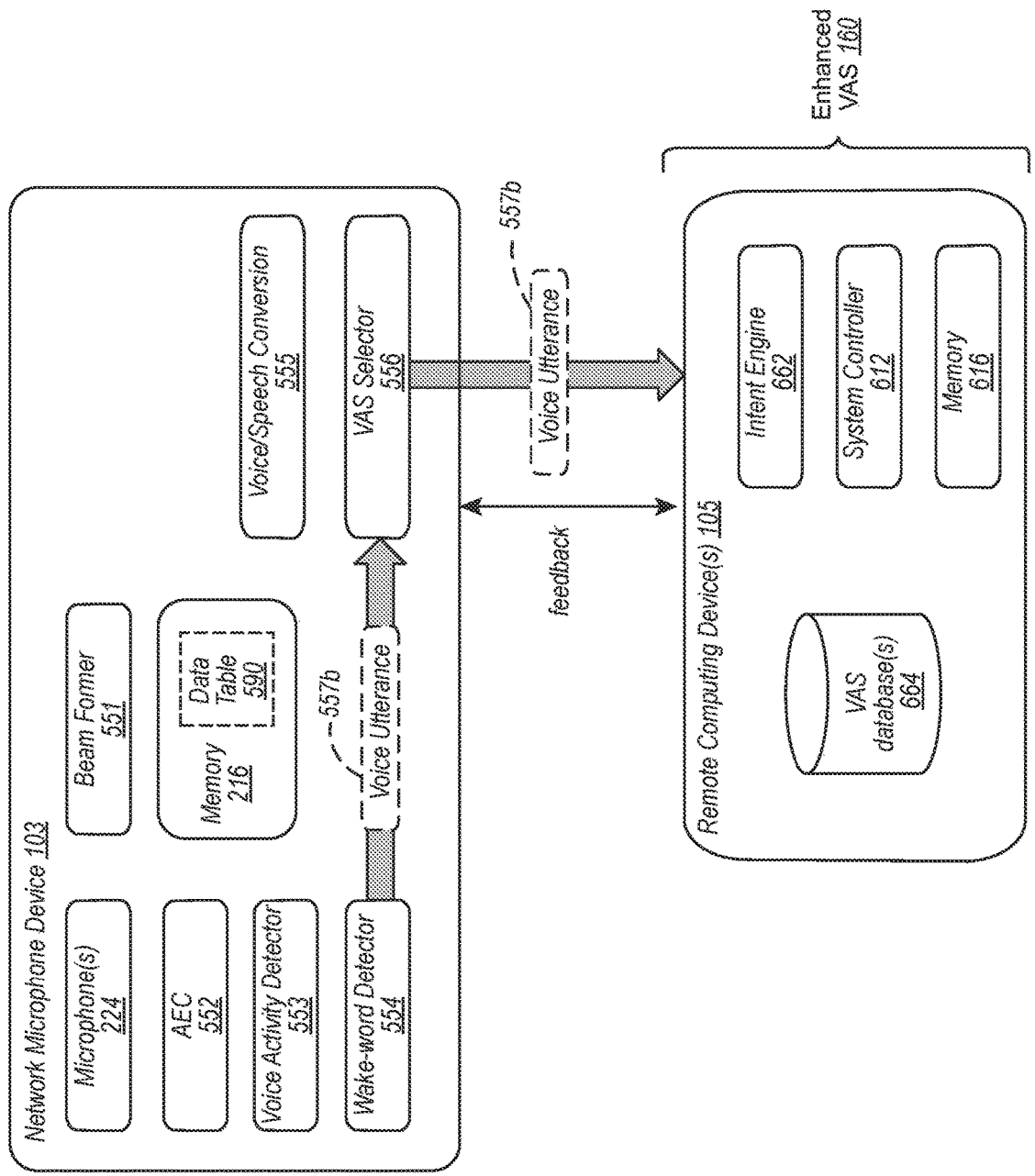
FIG. 6 is a functional block diagram of example remote computing device(s) in accordance with aspects of the disclosure.

FIG. 6 is a functional block diagram showing additional details of the remote computing device(s) 105 in FIG. 1. In various embodiments, the remote computing device(s) 105 may receive voice inputs from one or more of the NMDs 103 over the WAN 107 shown in FIG. 1. For purposes of illustration, selected communication paths of the voice input 557 (FIG. 5B) are represented by arrows in FIG. 6. In one embodiment, the voice input 557 processed by the remote computing device(s) 105 may include the voice utterance portion 557b (FIG. 5B). In another embodiment, the processed voice input 557 may include both the voice utterance portion 557b and the wake word 557a (FIG. 5B).

The remote computing device(s) 105 includes a system controller 612 comprising one or more processors, an intent engine 602, and a memory 616. The memory 616 may be a tangible computer-readable medium configured to store instructions executable by the system controller 612 and/or one or more of the playback, network microphone, and/or controller devices 102-104.

The intent engine 662 is configured to process a voice input and determine an intent of the input. In some embodiments, the intent engine 662 may be a subcomponent of the system controller 612. The intent engine 662 may interact with one or more database(s), such as one or more VAS database(s) 664, to process voice inputs. The VAS database(s) 664 may reside in the memory 616 or elsewhere, such as in memory of one or more of the playback, network microphone, and/or controller devices 102-104. In some embodiments, the VAS database(s) 664 may be updated for adaptive learning and feedback based on the voice input processing. The VAS database(s) 664 may store various user data, analytics, catalogs, and other information for NLU-related and/or other processing.

The remote computing device(s) 105 may exchange various feedback, information, instructions, and/or related data with the various playback, network microphone, and/or controller devices 102-104 of the media playback system 100. Such exchanges may be related to or independent of transmitted messages containing voice inputs. In some embodiments, the remote computing device(s) 105 and the media playback system 100 may exchange data via communication paths as described herein and/or using a metadata exchange channel as described in previously referenced U.S. patent application Ser. No. 15/438,749.

Processing of a voice input by devices of the media playback system 100 may be carried out at least partially in parallel with processing of the voice input by the remote computing device(s) 105. Additionally, the speech/text conversion components 555 of a network microphone device may convert responses from the remote computing device(s) 105 to speech for audible output via one or more speakers.

Figure 7A:
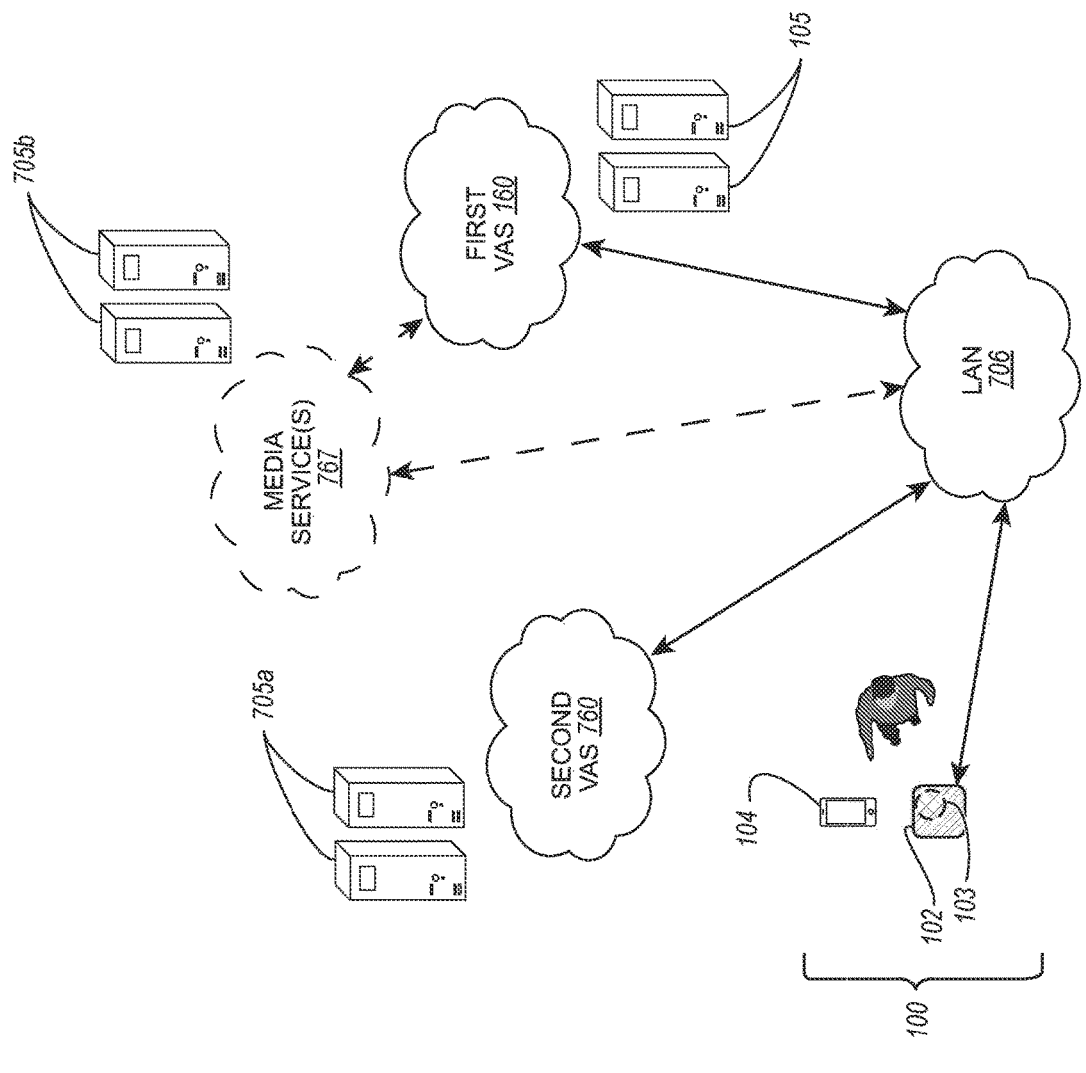
FIG. 7A is a schematic diagram of an example network system in accordance with aspects of the disclosure.

In accordance with various embodiments of the present disclosure, the remote computing device(s) 105 carry out functions of the first VAS 160 for the media playback system 100. FIG. 7A is schematic diagram of an example network system 700 that comprises the first VAS 160. As shown, the remote computing device(s) 105 are coupled to the media playback system 100 via the WAN 107 (FIG. 1) and/or a LAN 706 connected to the WAN 107. In this way, the various playback, network microphone, and controller devices 102-104 of the media playback system 100 may communicate with the remote computing device(s) 105 to invoke functions of the first VAS 160.

The network system 700 further includes additional first remote computing device(s) 705a (e.g., cloud servers) and second remote computing device(s) 705b (e.g., cloud servers). The second remote computing device(s) 705b may be associated with a media service provider 767, such as SPOTIFY® or PANDORA®. In some embodiments, the second remote computing device(s) 705b may communicate directly the computing device(s) of the first VAS 160. Additionally or alternatively, the second remote computing device(s) 705b may communicate with the media playback system 100 and/or other intervening remote computing device(s).

The first remote computing device(s) 705a may be associated with a second VAS 760. The second VAS 760 may be a traditional VAS provider associated with, e.g., AMAZON's ALEXA®, APPLE's SIRI®, MICROSOFT's CORTANA®, or another VAS provider. Although not shown for purposes of clarity, the network computing system 700 may further include remote computing devices associated with one or more additional VASes, such as additional traditional VASes. In such embodiments, media playback system 100 may be configured to select the first VAS 160 over the second VAS 760 as well as another VAS.

Figure 7B:
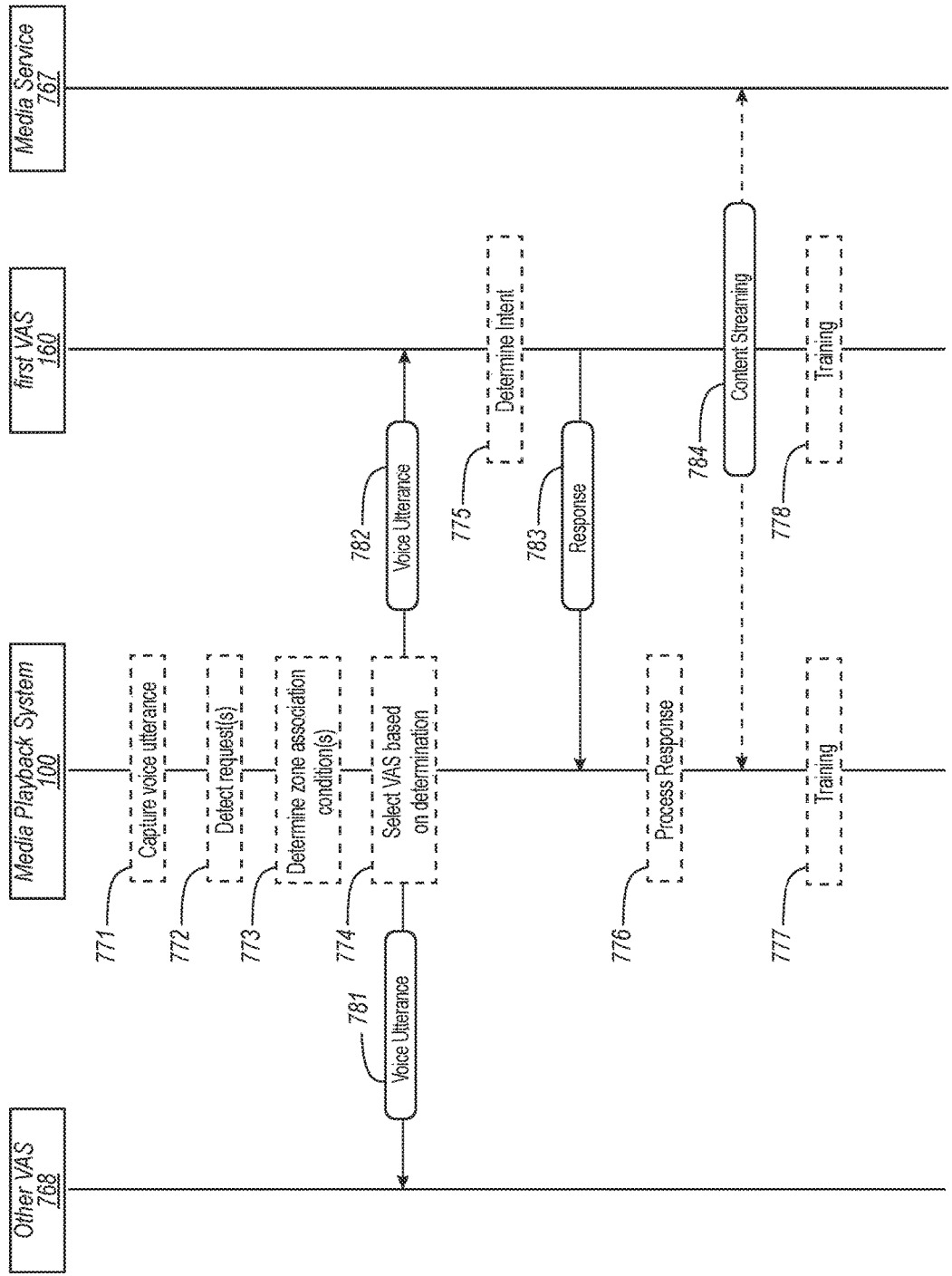
FIG. 7B is an example message flow implemented by the example network system of FIG. 7A in accordance with aspects of the disclosure.

FIG. 7B is a message flow diagram illustrating various data exchanges in the network computing system 700 of FIG. 7A. The media playback system 100 captures a voice input via a network microphone device (block 771), such as via one or more of the NMDs 103 shown in FIG. 1. The media playback system 100 may select an appropriate VAS based on commands and associated command criteria in the set of command information 590 (blocks 771-774), as described below. If the second VAS 760 is selected, the media playback system 100 may transmit one or messages 781 (e.g., packets) containing the voice input to the second VAS 760 for processing.

If, on the other hand, the first VAS 160 is selected, the media playback system 100 transmits one or more messages 782 (e.g., packets) containing the voice input to the VAS 160. The media playback system 100 may concurrently transmit other information to the VAS 160 with the message(s) 782. For example, the media playback system 100 may transmit data over a metadata channel, as described in previously referenced U.S. patent application Ser. No. 15/131,244.

The first VAS 160 may process the voice input in the message(s) 782 to determine intent (block 775). Based on the intent, the VAS 160 may send one or more response messages 783 (e.g., packets) to the media playback system 100. In some instances, the response message(s) 783 may include a payload that directs one or more of the devices of the media playback system 100 to execute instructions (block 776). For example, the instructions may direct the media playback system 100 to play back media content, group devices, and/or perform other functions described below. In addition or alternately, the response message(s) 783 from the VAS 160 may include a payload with a request for more information, such as in the case of multi-turn commands.

In some embodiments, the response message(s) 783 sent from the first VAS 160 may direct the media playback system 100 to request media content, such as audio content, from the media service(s) 667. In other embodiments, the media playback system 100 may request content independently from the VAS 160. In either case, the media playback system 100 may exchange messages for receiving content, such as via a media stream 784 comprising, e.g., audio content.

In some embodiments, the media playback system 100 may receive audio content from a line-in interface on a playback, network microphone, or other device over a local area network via a network interface. Example audio content includes one or more audio tracks, a talk show, a film, a television show, a podcast, an Internet streaming video, among many possible other forms of audio content. The audio content may be accompanied by video (e.g., an audio track of a video) or the audio content may be content that is unaccompanied by video.

In some embodiments, the media playback system 100 and/or the first VAS 160 may use voice inputs that result in successful (or unsuccessful) responses from the VAS for training and adaptive training and learning (blocks 777 and 778). Training and adaptive learning may enhance the accuracy of voice processing by the media playback system 100 and or the first VAS 160. In one example, the intent engine 662 (FIG. 6) may update and maintain training learning data in the VAS database(s) 664 for one or more user accounts associated with the media playback system 100.

III. Actuating a do not Disturb Feature

As discussed above, embodiments disclosed and described herein include automatic activation and deactivation of Do Not Disturb (DND) features by network microphone devices (NMDs), including but not limited to stand-alone NMDs, playback devices comprising NMDs, and other computing devices disclosed and described herein that comprise microphones and speakers and which are capable of processing requests for voice and/or video communication sessions and activating/deactivating a DND feature.

When activated, a DND feature causes the NMD in some circumstances to reject incoming requests for a communication session and perhaps also perform additional actions related to the request, as described herein. In some embodiments, the DND feature may be (i) a local DND feature activated on a single NMD, (ii) a group DND feature activated across a group of DNDs (e.g., activated in one or more NMDs of room group, one or more NMDs of a zone group, one or more NMDs of a synchrony group, one or more NMDs of a bonded pair or bonded group, and so on), or (iii) a network DND feature activated on all NMDs in a user's home network.

Figure 8:
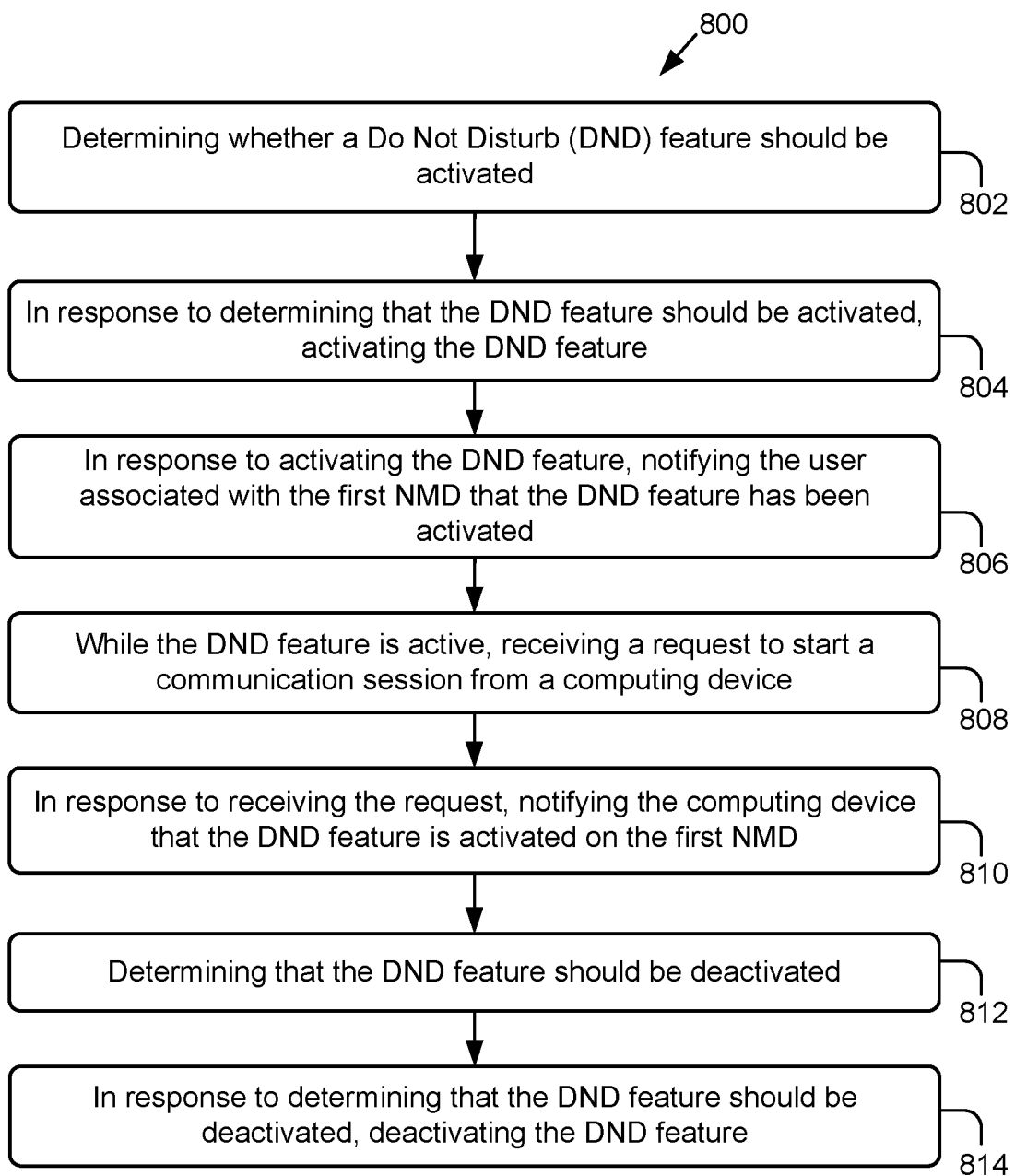
FIG. 8 is an example method of a network microphone device actuating a Do Not Disturb feature according to some embodiments.

FIG. 8 is an example method 800 of a NMD actuating a DND feature according to some embodiments.

Method 800 begins at block 802 where the NMD determines whether a DND feature should be activated.

In some embodiments, determining whether a DND feature should be activated at block 802 comprises receiving a voice command via the one or more microphones of the NMD to activate the DND feature at the NMD. In one example, the NMD determines that a local DND feature should be activated in response to receiving a voice command such as, "Hey Sonos, activate do not disturb." In response, the NMD activates the local DND feature.

In another example, a user has configured a home theater group. The home theater group may comprise a variety of combinations of NMDs. In some examples, a home theater group may include one Sonos PLAYBAR, one Sonos SUB, and two SONOS ONE playback devices. In operation, the user has configured the PLAYBAR, SUB, and SONOS ONE playback devices as a bonded group named "home theater" that is configured to play audio content in a surround sound arrangement. In this example, any of the PLAYBAR, SUB, or first and second SONOS ONE playback devices may perform the NMD functions described herein. For example, the playback devices in the "home theater" group may automatically determine that DND should be activated in certain circumstances, as described herein.

Alternatively, a separate NMD (e.g., an Amazon Echo with Alexa, an Apple iPhone with Siri, or other NMD in communication with a VAS) may perform the NMD functions described herein. In this example, the NMD determines that a group DND feature should be activated in response to receiving a voice command such as, "Hey Sonos, activate do not disturb for my home theater." In response, the NMD activates the group DND feature for one or more (or all) of the NMDs in the "home theater" group. Thus, if the PLAYBAR, SUB, and SONOS ONE devices all have NMD capabilities, then activating the group DND feature in response to the "Hey Sonos, activate do not disturb for my home theater" includes activating the group DND feature at each of the PLAYBAR, SUB, and SONOS ONE devices in the "home theater" group, which may, in some embodiments, amount to activating individual local DND features at each device. If only some but not all of the devices in the "home theater" group have NMD capabilities, then activating the group DND feature in response to the "Hey Sonos, activate do not disturb for my home theater" includes activating the group DND feature at the devices in the "home theater" group that have NMD capabilities. In some embodiments, this may amount to activating individual local DND features at each device in the "home theater" group having NMD capabilities.

In other variations on this example, the NMD may be an Amazon Echo with Alexa (or similar device) located in the same room as the "home theater" group. Additionally, the Amazon Echo (or similar device) may even be a member of the "home theater" group or a designated NMD for the "home theater" group. In either example, the Amazon Echo (or similar) may activate the group DND feature in response to a command such as "Hey Alexa, activate do not disturb for my home theater," which includes activating the group DND at all of the devices in the "home theater" group (and/or at least associated with the "home theater" group, e.g., as a designated NMD for the "home theater" group) that have NMD capabilities, which may, in some examples, include activating individual local DND features at each device in the "home theater" group (or at least associated with the "home theater" group), having NMD capabilities. In some embodiments, if the only NMD in the "home theater" group (or associated with the "home theater" group) is the Amazon Echo with Alexa (or similar device), then activating the group DND feature in response to a command such as "Hey Alexa, activate do not disturb for my home theater" (or similar command) includes activating a local DND feature at the Amazon Echo with Alexa device (or similar NMD).

In different examples, the user has created a group called "Bedrooms" that includes all the NMDs in all the bedrooms of the user's home. Alternatively, in some embodiments, an NMD may automatically configure a group called "Bedrooms" that includes every NMD with "bedroom" in its name (e.g., "master bedroom," "guest bedroom," "Jack's bedroom," "Jill's bedroom," etc.). In similar examples, a controller application configured to control the NMD may automatically configure a group called "Bedrooms" that includes every NMD with "bedroom" in its name. In this example, the user may also manually configure a group called "Bedrooms" via the controller application. Regardless of whether the "Bedrooms" group is manually configured by the user or automatically configured by an NMD or controller application, the NMD determines that a group DND feature should be activated in response to receiving a voice command such as, "Hey Sonos, activate do not disturb in the bedrooms." In response, the NMD activates the group DND feature for all of the NMDs in the "Bedrooms" group, which may, in some embodiments, amount to activating a local DND feature at each NMD in the "Bedrooms" group.

Additionally, this manual or automatic group creation is possible with many other types of rooms. For example, a user may have multiple offices within a home. In this example, the NMD or controller application may automatically configure a group called "Offices" for every NMD with "office" in its name (e.g., "Jack's office", "Jill's office", etc.). Many other examples are possible, too.

In another example, the NMD determines that a network DND feature should be activated in response to receiving a voice command such as, "Hey Sonos, activate do not disturb everywhere." In response, the NMD activates the network DND feature at every NMD in the user's home, which may, in some embodiments, including activating a local DND feature at each NMD in the user's home.

In some examples in response to receiving a voice command involving activating the DND feature in multiple NMDs, zones, or groups, NMDs at locations other than where the command was received may prompt alternate users for confirmation of DND feature activation. For example, one NMD (e.g. "Jill's room") receives a voice command such as "Hey Sonos, activate do not disturb in the bedrooms." A second NMD in the "Bedrooms" group (e.g. "Jack's room") may output a prompt for a second user's confirmation by, for example, an audible alert (e.g. "Would you like to activate do not disturb mode"). Alternatively, the NMD may communicate with a controller device by way of a controller application (e.g., a second user receives a notification on a smartphone via an application). In response to receiving a negative indication (e.g., a spoken, "no," or a user indication of "no" via the controller application), the second NMD determines that the DND feature should not be activated. In example scenarios where no user feedback is received, the second NMD determines that the DND feature should be activated.

In some embodiments, determining whether a DND feature should be activated at block 802 additionally or alternatively comprises a first NMD determining, at least one of, (i) that a hard-kill switch of the first NMD has cut power to the one or more microphones of the first NMD, (ii) that a soft-kill switch of the first NMD has deactivated the one or more microphones of the first NMD, (iii) that a hard-kill switch of a second NMD has cut power to one or more microphones of the second NMD, and/or (iv) that a soft-kill switch of the second NMD has deactivated the one or more microphones of the second NMD.

For example, as described with reference to FIG. 2B, NMDs in some embodiments include a hard-kill switch that can be toggled between "on" and "off" states. In some embodiments, when the hard-kill switch is in the "on" state, the NMD supplies power to the microphones and voice-processing components of the NMD, but the NMD can still activate and deactivate the microphones and voice-processing components of the NMD. And, when the hard-kill switch is in the "off" state, the NMD cuts power to the microphones and voice-processing components of the NMD, and the NMD cannot activate the microphones of the NMD. By setting the hard-kill switch to the "off" position, a user concerned with privacy can be confident that the NMD cannot possibly detect, record, or process (even accidentally) spoken words because the voice microphones and voice-processing components have been powered off and are therefore physically unable to detect, record, or process spoken words or other sounds.

For embodiments where the NMD has a hard-kill switch, the NMD determines whether a DND feature should be activated at block 802 by determining that the hard-kill switch has cut power to the one or more microphones. In such a scenario, because the NMD has cut power to the microphones and voice-processing components, the NMD cannot possibly engage in a voice or video communication session. Therefore, in such embodiments, the NMD activates a local DND feature in response to detecting that the hard-kill switch has cut power to the one or more microphones of the NMD.

In another example, and as described with reference to FIG. 2B, NMDs in some embodiments include a soft-kill switch that can be toggled between "on" and "off" states. When the soft-kill switch is in the "on" state, the microphones are enabled, and the NMD is listening for and recording wake words and voice commands for processing by the NMD and/or VAS. When the soft-kill switch is in the "off" state, the microphones are disabled and do not listen for or record wake words or voice commands for processing even though the NMD is still providing power to the microphones and voice-processing components of the NMD.

For embodiments where the NMD has a soft-kill switch, the NMD determines whether a DND feature should be activated at block 802 by determining that the soft-kill switch has disabled the one or more microphones and/or voice-processing components in response to a user input via the soft-kill switch. In such a scenario, because the NMD has disabled the microphones and voice-processing components in response to user input via the soft-kill switch, the NMD infers that the user does not wish to be disturbed by a request for a voice or video communication session. Therefore, in such embodiments, the NMD activates a local DND feature in response to detecting that the soft-kill switch has deactivated the one or more microphones of the NMD.

In some embodiments, the NMD determines that a DND feature should be activated at block 802 in response to determining that either (i) a hard-kill switch of a second NMD has cut power to one or more microphones of the second NMD or (ii) a soft-kill switch of the second NMD has deactivated the one or more microphones of the second NMD.

For example, if the NMD and the second NMD are in a group (e.g., a room group, zone group, synchrony group, bonded pair, bonded group, or other grouping), then in some embodiments, the NMD may determine that it should activate a DND feature in response to determining that another NMD has powered off (e.g., via a hard-kill switch) or deactivated (e.g., via a soft-kill switch) its microphones.

In some embodiments, when one NMD powers off or deactivates its microphones (via a hard-kill or soft-kill switch, respectively), the NMD broadcasts a status message or otherwise notifies one or more other NMDs that are grouped with the NMD (e.g., in the same room group, zone group, synchrony group, bonded pair, bonded group, and/or other grouping) that (i) it has powered off or deactivated its microphones and/or (ii) it has activated a DND feature, e.g., a local, group, or network DND feature. And in some embodiments, in response to receiving a status message that another NMD in the group has powered off or deactivated its microphones and/or activated a DND feature, one or more (or all) of the other NMDs in the group activate a local DND feature. In this manner, an individual NMD in a group of NMDs determines whether it should activate a DND feature in response to receiving a message from another NMD in the group of NMDs comprising one or more of (i) an instruction to activate a local DND feature and/or (ii) message advising the individual NMD that another NMD in its group has powered off or deactivated its microphones.

In some embodiments, determining whether a DND feature should be activated at block 802 additionally or alternatively comprises at least one of (i) detecting whether the NMD is playing audio content; (ii) detecting whether the NMD is playing audio content associated with video content; (iii) detecting whether the NMD is playing audio content from a playlist designated by a user to trigger activation of the DND feature; (iv) detecting whether the NMD is playing audio content comprising one of an audio book and a podcast; and (v) detecting whether an interactive session between a user and a voice assistant servicer (VAS) via the NMD is in process.

In some embodiments, an NMD can be configured, e.g., via instructions from a controller application running on a controller device, to activate a DND feature while the NMD is playing audio content. In some embodiments, a user can configure the NMD to activate a DND feature when the NMD is playing specific types of audio content. In some embodiments, a user can configure the NMD to activate a DND feature when the NMD is playing specific genres of audio content, audio content by particular artists, and/or audio content from specific audio content sources (e.g., Spotify, Amazon Prime Music, Pandora, Apple Music, and/or other sources).

In one example, if the NMD is configured to activate a DND feature while the NMD is playing music, then determining whether a DND feature should be activated at block 802 includes determining whether the NMD is playing music. In such embodiments, the NMD activates a DND feature in response to playing music. And in some embodiments, the NMD later deactivates the DND feature in response to stopping playing music.

In another example, if the NMD is configured to activate a DND feature while the NMD is playing audio content associated with video content (e.g., audio content that accompanies a television show, movie, or online video like YouTube or similar), then determining whether a DND feature should be activated at block 802 includes determining whether the NMD is playing audio content associated with video content. In such embodiments, the NMD activates a DND feature in response to playing audio content associated with video content. And in some embodiments, the NMD later deactivates the DND feature in response to stopping playing audio content associated with video content.

In some embodiments, an NMD determines that it is playing audio content associated with video content based on metadata in the audio content stream that informs the NMD that the audio content is associated with video content. In some embodiments, an NMD determines that it is playing audio content associated with video content based additionally or alternatively on receiving the audio content from a source that provides video content, e.g., Hulu, Netflix, YouTube, HBO Now, and similar media. In some embodiments, an NMD determines that it is playing audio content associated with video content based additionally or alternatively on receiving the audio content from a specific input, e.g., a wired or wireless audio input from or otherwise associated with one or more of a television, set-top box, streaming video player, or other device associated with video content.

In yet another example, if the NMD is configured to activate a DND feature while the NMD is playing an audio book or podcast, then determining whether a DND feature should be activated at block 802 includes determining whether the NMD is playing an audio book or podcast. In such embodiments, the NMD activates a DND feature in response to playing an audio book or podcast. And in some embodiments, the NMD later deactivates the DND feature in response to stopping playing an audio book or podcast.

In a further example, if the NMD is configured to activate a DND feature while the NMD is playing music from a specific playlist (e.g., a dinner playlist or a party playlist), then determining whether a DND feature should be activated at block 802 includes determining whether the NMD is playing audio content from a playlist designated to trigger activation of a DND feature. In operation, a user designates which playlist(s) trigger activation of a DND feature. In some embodiments, the NMD may infer that a particular playlist should trigger activation of a DND feature, for example, based on the name of the playlist (e.g., if the playlist includes words like lullaby, sleep, relax, dinner, party, quiet, focus, and so on). In such embodiments, the NMD activates a DND feature in response to playing a playlist designated to trigger activation of a DND feature. And in some embodiments, the NMD later deactivates the DND feature in response to stopping playing a playlist designated to trigger activation of the DND feature.

In yet another example, if the NMD is configured to activate a DND feature while an interactive session between a user and a VAS via the NMD is in process, then determining whether a DND feature should be activated at block 802 includes determining whether an interactive session between a user and a VAS via the NMD is in process. In such embodiments, the NMD activates a DND feature in response to starting an interactive session between the user and the VAS. For example, the user may be updating a grocery list using Amazon Alexa (or similar device) In this instance, the NMD may determine that the DND feature should be activated once the user initiates the conversation with Alexa. Additionally, the NMD may later deactivate the DND feature in response to terminating the interactive session between the user and the VAS (e.g., once the user is done updating the list of groceries).

Next, method 800 advances to block 804 where, in response to determining that the DND feature should be activated, the NMD activates the DND feature at the NMD.

In some embodiments, activating the DND feature at block 804 comprises activating the DND feature at a first NMD and activating the DND feature at a second NMD on the same LAN as the first NMD, wherein the first NMD and second NMD are at least one of (i) members of a room group, (ii) members of a zone group, (iii) members of a synchrony group, (iv) a bonded playback device, (v) a stereo pair of playback devices, and (vi) manufactured by different manufacturers or suppliers.

For example, if the first NMD and the second NMD are in a group (e.g., a room group, zone group, synchrony group, bonded pair, bonded group, or other grouping), then in some embodiments, when the first NMD activates the DND feature at block 804, the first NMD also activates a DND feature at a second NMD. In operation, the first NMD sends a command or otherwise instructs the second NMD to activate the DND feature at the second NMD.

In one example, a synchrony group includes four Sonos playback devices (e.g. one SONOS PLAYBAR, one SONOS SUB, and two SONOS ONE players), where the user has configured the PLAYBAR, SUB, and SONOS ONE playback devices as a bonded "home theater" group. When a first Sonos playback device in the synchrony group activates a DND feature applicable to the synchrony group (e.g., a group DND or a network DND), the first Sonos playback device instructs the other three Sonos playback devices in the synchrony group to each activate a DND feature, too. For example, if the PLAYBAR activates a DND feature applicable to the "home theater" group, the PLAYBAR instructs the SUB and SONOS ONE devices to each activate a DND feature also.

In some embodiments, the first NMD is manufactured by a first manufacturer or supplier, and the second NMD is manufactured by a second manufacturer or supplier. In one example, the first NMD is a Sonos playback device (e.g., a SONOS ONE) and the second NMD in an Amazon Echo. If the SONOS ONE and Amazon Echo are grouped in the same room, then in some embodiments, when the SONOS ONE activates a DND feature applicable to its room group (e.g., a group DND or a network DND), the SONOS ONE also instructs the Amazon Echo to activate a DND feature. Likewise, when the Amazon Echo activates a DND feature applicable to its room group (e.g., a group DND or network DND), the Amazon Echo also instructs the Sonos ONE to activate a DND feature.

In some embodiments, block 804 additionally includes sending at least one of (i) a first indication to a first controller application that the DND feature has been activated, and (ii) a second indication to a second controller application that the DND feature has been activated.

In one example, a network includes Sonos NMDs and NMDs from another supplier, e.g., Amazon. In operation, a user configures and controls the Sonos NMDs via a Sonos controller application running on a controller device (e.g., the user's smartphone or other computing device), and the user controls the Amazon NMDs via an Amazon controller application running on a controller device (e.g., the user's smartphone or other computing device). In some embodiments, the Sonos controller application can control at least some aspects of the Amazon NMDs and the Amazon controller application can control at least some aspects of the Sonos NMDs. Therefore, in such embodiments, when the Sonos NMD activates a DND feature, the Sonos NMD sends a status message to the Sonos controller application indicating that the Sonos NMD has activated the DND feature, and the Sonos NMD also sends a status message to the Amazon controller application indicating that the Sonos NMD has activated the DND feature. Similarly, when the Amazon NMD activates a DND feature, the Amazon NMD sends a status message to the Amazon controller application indicating that the Amazon NMD has activated the DND feature, and the Amazon NMD also sends a status message to the Sonos controller application indicating that the Amazon NMD has activated the DND feature. In operation, the Sonos NMD sends the status message to the Sonos and Amazon controller applications (i) when the Sonos NMD activates the DND feature and/or (ii) in response to a status query received from either (or both) of the Sonos and Amazon controller applications. Likewise, the Amazon NMD sends the status message to the Sonos and Amazon controller applications (i) when the Amazon NMD activates the DND feature and/or (ii) in response to a status query received from either (or both) of the Sonos and Amazon controller applications. After the Sonos and Amazon controller applications receive the status messages from the Sonos and Amazon NMDs, a user can see the DND feature activation/deactivation status for each Sonos and Amazon NMD in either (or both) of the Sonos controller application and/or the Amazon controller application.

Next, method 800 advances to block 806 where the NMD notifies a user associated with the first NMD that the DND feature has been activated.

In some embodiments, notifying the user associated with the NMD that the DND feature has been activated in block 806 comprises one or more of (i) sending one or more of a text message, app notification, or email to one or more computing devices associated with the user, (ii) playing an audio announcement via the one or more speakers indicating that the DND feature is activated, (iii) activing a flashing light on the NMD, and (iv) causing a video screen associated with the NMD to display an on-screen message indicating that the DND feature is activated.

For example, the NMD may send the alert to a smart phone associated with the user. The user may have a previously configured smart phone application. In this example, the NMD may send a notification to the user that the DND feature has been activated by way of the application. In similar examples, the user may have a phone number or e-mail address associated with the NMD. In these examples, the NMD may send a text message to the cell phone number or an e-mail to the e-mail address alerting the user that the DND feature has been activated. Additionally or alternatively, the NMD may send more than one alert through various channels (e.g., a smartphone application notification and a text message).

In some alternate embodiments, the NMD plays an audible alert to let the user know when the NMD has activated the DND feature. For an NMD configured to activate a DND feature when playing audio, the NMD plays a short audible alert right before beginning playing the audio content to remind the user that DND is activated. Similarly, when the NMD stops playing the audio content, the NMD plays a different, short audible alert to remind the user that DND is no longer activated. An NMD additionally or alternatively configured to inform a user when the NMD activates/deactivates a DND feature via the other notification mechanisms listed above function similarly, e.g., by notifying the user via the notification mechanism when the NMD activates the DND feature and when the NMD deactivates the DND feature.

Alternatively or additionally, if there is video content associated with the audio content, the NMD may cause a video screen associated with the NMD to display an on-screen message indicating that the DND feature has been activated. For example, if the NMD is in a zone or group called "Living Room", the associated screen may display the message "Do Not Disturb has been activated in the Living Room". Many other examples are possible, too.

Next, method 800 advances to block 808 where, while the DND feature is active, the NMD receives a request to start a communication session from a computing device. In operation, the communication session can be any one of (i) an intercom session, (ii) a communication session comprising one or both of Voice over Internet Protocol (VOIP) and video, and (iii) a telephone call. For example, the communication can be an "intercom" or "drop-in" session, a "talk" session, or a "call" session, as described earlier. In another example, the NMD may be configured to interface with one or more features of a house (e.g., a doorbell/intercom). In this example, the request to start a communication session from a computing device involves a doorbell ring that initiates a "intercom" type of communication session between the NMD and the doorbell/intercom system.

Next method 800 advances to block 810 where, in response to receiving the request, the NMD notifies the computing device that sent the request (i.e., the requesting computing device) that the DND feature is activated on the NMD. For example, if the request is an intercom session from a second NMD in the same house by a second user, the NMD will notify the second NMD that the DND feature is activated. The second NMD may then notify the second user via, for example, an audible message (e.g., "home theater has do not disturb feature activated").

In some embodiments, block 810 additionally or alternatively includes one or more of (1) notifying the requesting computing device of audio content that the NMD was playing when the NMD received the request, (ii) directing the request to a second NMD, e.g., another NMD in the user's house, (iii) directing the request to a mobile phone, e.g., a mobile phone associated with the NMD or perhaps to another mobile phone number designated to receive calls diverted from the NMD while DND is activated, (iv) directing the request to a voice mailbox, (v) sending an inaudible notification of the request to a user associated with the first NMD (e.g., a text message, app alert, on-screen alert, and so on), or least sending such an inaudible notification to the user's smartphone or other computing device, and (vi) logging the request at one or more controller applications associated with the first NMD so that the user can later access the log to see the requests that the NMD received while the DND feature was active.

For example, in some embodiments, a user may wish to selectively enforce the DND feature based on the type of communication session and/or the source of the requested communication session. In one example, a user may want the DND feature to block an incoming request for a communication session originating from outside his or her home (e.g., a VoIP voice or video call from outside the home) and reroute such requests to voicemail or a mobile phone, for example. But the user may not want the DND feature to block an incoming request for a communication originating from another NMD in his or her home (e.g., an "intercom" session from another NMD inside the home).

Next, method 800 advances to block 812 where the NMD determines that the DND feature should be deactivated.

In some embodiments, determining whether a DND feature should be deactivated at block 812 comprises receiving a voice command via the one or more microphones of the NMD to deactivate the DND feature at the NMD.

In some embodiments, determining whether a DND feature should be deactivated at block 812 additionally or alternatively comprises at least one of (i) determining that a hard-kill switch of the first NMD has restored power to the one or more microphones of the first NMD, (ii) determining that a soft-kill switch of the first NMD has reactivated the one or more microphones of the first NMD, (iii) determining that a hard-kill switch of a second NMD has restored power to one or more microphones of the second NMD, and (iv) determining that a soft-kill switch of the second NMD has reactivated the one or more microphones of the second NMD.

In some embodiments, determining whether a DND feature should be deactivated at block 812 additionally or alternatively comprises at least one of (i) determining that the first NMD is no longer playing audio content; (ii) determining that the first NMD is no longer playing audio content associated with video content; (iii) determining that the first NMD is no longer playing audio content from a playlist designated by a user to trigger activation of the DND feature; (iv) determining that the first NMD is no longer playing audio content comprising one of an audio book and a podcast; and (v) determining that an interactive session between a user and a voice assistant servicer (VAS) via the first NMD is no longer in process.

Next, method 800 advances to block 814 where, in response to determining that the DND feature should be deactivated, the NMD deactivates the DND feature at the NMD.

In some embodiments, deactivating the DND feature at block 814 additionally comprises at least one of (i) generating an audible notification indicating that a request was received while the DND feature was activated (if a request was received while the DND feature was activated), (ii) generating an audible notification that the DND feature is no longer activated, (iii) sending a first indication to a first controller application that the DND feature is no longer activated (e.g., if the NMD is a Sonos NMD, sending a status message to the Sonos controller application similar to how a Sonos NMD sends a status message to the Sonos controller application to inform the Sonos controller application that the Sonos NMD has activated the DND feature, as described previously), and (iv) sending a second indication to a second controller application that the DND feature is no longer activated (e.g., if the NMD is a Sonos NMD, sending a status message to an Amazon controller application similar to how a Sonos NMD sends a status message to the Amazon controller application to inform the Amazon controller application that the Sonos NMD has activated the DND feature, as described previously).

As mentioned above, in some embodiments of method 800, the actions that the NMD takes in response to receiving the request may vary depending on whether (i) the NMD receives the request to the start the communication session from a computing device that is on the same LAN as the NMD or (ii) the NMD receives the request to the start the communication session from a computing device that is not on the same LAN as the NMD.

For example, in some embodiments, in response to receiving the request and determining that the request originated from a first computing device on the same LAN as the NMD, the NMD generates an audible notification of at least one of (i) the request and (ii) the origin of the request. In a previously-described scenario, if a user's Kitchen NMD has a DND feature activated, and the user's Basement NMD sends a request to start an "intercom" communication session to the Kitchen NMD, and if the Kitchen NMD is configured to accept requests from other NMDs in the same household even though the DND feature is activated, then the Kitchen NMD may generate an audible alert that states, "You have an Intercom request from the Basement. Would you like to accept?" In some embodiments, if the Kitchen NMD is playing audio content when it receives the intercom request from the Basement NMD, the Kitchen NMD ducks (or lowers) the playback volume of the audio content when it plays the audible alert.

Similarly, in some embodiments, and in response to receiving the request and determining that the request originated from a second computing device not on the same LAN as the NMD, the NMD performs at least one of the following previously-described functions of (i) notifying the computing device that the DND feature is activated on the first NMD, (ii) notifying the computing device of audio content that the NMD was playing when the NMD received the request, (iii) directing the request to another NMD, (iv) directing the request to a mobile phone, (v) directing the request to a voice mailbox, (vi) sending an inaudible notification of the request to a user associated with the NMD, and (vii) logging the request at one or more controller applications associated with the NMD.

Figure 9:
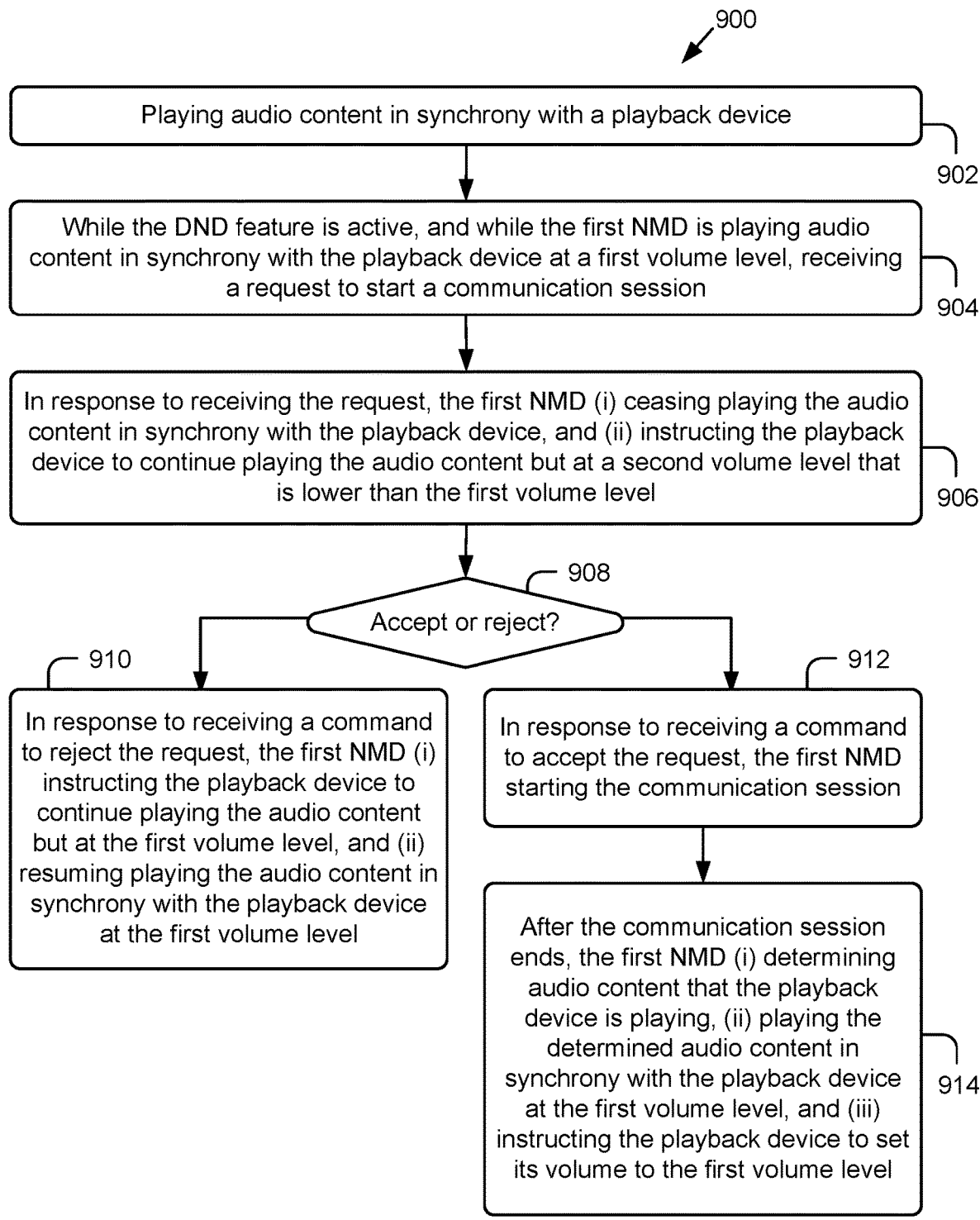
FIG. 9 is an example method of a network microphone device managing a request to start a communication session in a synchrony group where at least one device in the synchrony group has a Do Not Disturb feature activated.

FIG. 9 is an example method 900 of a NMD managing a request to start a communication session in a synchrony group where at least one device in the synchrony group has a DND feature activated.

Method 900 begins at block 902 where the NMD plays audio content in synchrony with a playback device.

Next, method 900 advances to block 904 where, while the DND feature is active, and while the NMD is playing audio content in synchrony with the playback device at a first volume level, the NMD receives a request to start a communication session. In operation, the communication session is one of (i) an intercom session, (ii) a communication session comprising one or both of Voice over Internet Protocol (VOIP) or video, and (iii) a telephone call. For example, the communication can be an "intercom" or "drop-in" session, a "talk" session, or a "call" session, as described earlier.

Next, method 900 advances to block 906 where, in response to receiving the request, the NMD (i) ceases playing the audio content in synchrony with the playback device, and (ii) instructs the playback device to continue playing the audio content but at a second volume level that is lower than the first volume level, i.e., the NMD instructs the playback device to duck its volume.

Next, method 900 advances to block 908, where the NMD waits to receive a command to accept the request or a command to reject the request.

If the NMD receives a command to reject the request, then method 900 advances to block 910 where, in response to receiving the command to reject the request, the NMD (i) instructs the playback device to continue playing the audio content but at the first volume level, and (ii) resumes playing the audio content in synchrony with the playback device at the first volume level.

But, if the NMD receives a command to accept the request, then method 800 advances to block 912 where, in response to receiving the command to accept the request, the NMD starts the communication session.

Next, method 900 advances to block 914 where, after the communication session ends, the first NMD (i) determines audio content that the playback device is playing, (ii) plays the determined audio content in synchrony with the playback device at the first volume level, and (iii) instructs the playback device to set its volume back to the first volume level.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing system comprising:
at least one processor; and
at least one tangible, non-transitory computer-readable medium comprising program instructions that are executable by the at least one processor such that the computing system is configured to:
determine whether a Do Not Disturb (DND) feature should be activated for a group of two or more devices that are separate from the computing system;
in response to determining that the DND feature should be activated for the group, activate the DND feature on each of the two or more devices in the group; and
when at least one device in the group receives an incoming communication request for a first type of communication session while the DND feature is activated for the group, cause another device separate from the group to process the first type of communication session while the DND feature is activated for the group rather than blocking the first type of communication session.

2. The computing system of claim 1, wherein the group of two or more devices are grouped together to play audio content in a groupwise manner.

3. The computing system of claim 1, wherein the group of two or more devices comprises at least one smartphone.

4. The computing system of claim 1, wherein the group of two or more devices comprises at least one media playback device.

5. The computing system of claim 1, wherein the group of two or more devices comprises at least one speaker.

6. The computing system of claim 1, wherein the program instructions that are executable by the at least one processor such that the computing system is configured to determine whether the DND feature should be activated for the group of two or more devices separate from the computing system comprise program instructions that are executable by the at least one processor such that the computing system is configured to:
receive a command from a user indicating that the DND feature should be activated for the group of two or more devices; and
determine that the DND feature should be activated for the group of two or more devices based on the received command.

7. The computing system of claim 6, wherein the command comprises a voice command from the user.

8. The computing system of claim 1, wherein the computing system comprises a network microphone device (NMD).

9. The computing system of claim 8, wherein the NMD comprises a smartphone.

10. The computing system of claim 1, wherein the computing system comprises a voice assistant service (VAS).

11. Tangible, non-transitory computer-readable media comprising program instructions that are executable by one or more processors such that a computing system is configured to perform functions comprising:
determining whether a Do Not Disturb (DND) feature should be activated for a group of two or more devices that are separate from the computing system;
in response to determining that the DND feature should be activated, activating the DND feature on each of the two or more devices in the group; and when at least one device in the group receives an incoming communication request for a first type of communication session while the DND feature is activated for the group, causing another device separate from the group to process the first type of communication session while the DND feature is activated for the group rather than blocking the first type of communication session.

12. The tangible, non-transitory computer-readable media of claim 11, wherein the group of two or more devices are grouped together to play audio content in a groupwise manner.

13. The tangible, non-transitory computer-readable media of claim 11, wherein the group of two or more devices comprise at least one smartphone.

14. The tangible, non-transitory computer-readable media of claim 11, wherein the group of two or more devices comprise at least one media playback device.

15. The tangible, non-transitory computer-readable media of claim 11, wherein the group of two or more devices comprise at least one speaker.

16. The tangible, non-transitory computer-readable media of claim 11, wherein determining whether the Do Not Disturb (DND) feature should be activated for the group of two or more devices that are separate from the computing system comprises:
   receiving a command from a user indicating that the DND feature should be activated for the group of two or more devices; and
   determining that the DND feature should be activated for the group of two or more devices based on the received command.

17. The tangible, non-transitory computer-readable media of claim 16, wherein the command comprises a voice command from the user.

18. The tangible, non-transitory computer-readable media of claim 11, wherein the computing system comprises a network microphone device (NMD).

19. The tangible, non-transitory computer-readable media of claim 18, wherein the NMD comprises a smartphone.

20. The tangible, non-transitory computer-readable media of claim 11, wherein the computing system comprises a voice assistant service (VAS).

* * * * *